(12) United States Patent
Patel et al.

(10) Patent No.: US 11,494,506 B2
(45) Date of Patent: Nov. 8, 2022

(54) SECURITY MEASURES FOR DETERMINATION OF PRIVATE SET INTERSECTIONS

(71) Applicant: Google LLC, Mountain View, CA (US)

(72) Inventors: Sarvar Patel, Mountain View, CA (US); Marcel M. Moti Yung, Mountain View, CA (US); Karn Seth, Mountain View, CA (US); Benjamin Kreuter, Mountain View, CA (US)

(73) Assignee: Google LLC, Mountain View, CA (US)

( * ) Notice: Subject to any disclaimer, the term of this patent is extended or adjusted under 35 U.S.C. 154(b) by 422 days.

(21) Appl. No.: 16/486,281

(22) PCT Filed: Apr. 19, 2019

(86) PCT No.: PCT/US2019/028295
§ 371 (c)(1),
(2) Date: Aug. 15, 2019

(87) PCT Pub. No.: WO2019/204711
PCT Pub. Date: Oct. 24, 2019

(65) Prior Publication Data
US 2022/0004654 A1    Jan. 6, 2022

Related U.S. Application Data

(60) Provisional application No. 62/660,108, filed on Apr. 19, 2018.

(51) Int. Cl.
*G06F 21/62* (2013.01)
*H04L 9/00* (2022.01)

(52) U.S. Cl.
CPC .......... *G06F 21/6218* (2013.01); *H04L 9/008* (2013.01)

(58) Field of Classification Search
CPC ....... H04L 9/0838; H04L 9/008; H04L 9/083; H04L 9/0844; H04L 9/32; H04L 63/06;
(Continued)

(56) References Cited

U.S. PATENT DOCUMENTS 10,348,494 B2 * 7/2019 Jung ........................ H04L 9/00
2016/0078431 A1 * 3/2016 Ramachandran .. G06Q 30/0605
705/64

(Continued)

FOREIGN PATENT DOCUMENTS

WO    WO 2017/160317    9/2017

OTHER PUBLICATIONS

Camenisch et al., "Private Intersection of Certified Sets," International Conference on Computer Analysis of Images and Patterns, Feb. 2009, 20 pages.
(Continued)

*Primary Examiner* — Meng Li
(74) *Attorney, Agent, or Firm* — Fish & Richardson P.C.

(57) ABSTRACT

Systems, methods, devices, and other techniques for preserving privacy when comparing private datasets from first and second computing systems. The second computing system identifies a first set of identifiers corresponding to records in a private database of the second computing system. The second computing system receives blinded versions of a set of identifiers corresponding to records in a private database of the first computing system. The second computing system determines an intersection or characteristic thereof of the records in the private database of the first computing system and the records in the private database of the second computing system based on matches between the blinded versions of the first and second sets of identifiers.

20 Claims, 10 Drawing Sheets

(58) Field of Classification Search
CPC ....... H04L 9/30; H04L 9/3013; H04L 9/3066; H04L 9/0866; G06F 9/44; G06F 21/6254
See application file for complete search history.

(56) References Cited

U.S. PATENT DOCUMENTS

2019/0296897 A1* 9/2019 Resch ................... H04L 9/083
2019/0297064 A1* 9/2019 Resch ................... H04L 9/3247

OTHER PUBLICATIONS

PCT International Search Report and Written Opinion in International Appln. No. PCT/US2019/028295, dated Jun. 28, 2019, 14 pages.
International Preliminary Report on Patentability in International Appln. No. PCT/US2019/028295, dated Oct. 20, 2020, 7 pages.

* cited by examiner

Private Database 1

| Device ID | Universal ID | Provider ID | Date Stamp |
|---|---|---|---|
| G10967 | 00045 | A | 15-Jul |
| B632519 | 18509 | B | 14-Jul |
| N87611 | 78204 | B | 15-Jul |
| E73923 | 29578 | B | 15-Jul |
| B92077 | 89111 | B | 18-Jul |
| W99891 | 71298 | B | 19-Jul |
| N987601 | 41123 | B | 20-Jul |
| G187099 | 44128 | D | 15-Jul |

Private Database 2

| Client ID | Universal ID | Transaction Amount | Date Stamp |
|---|---|---|---|
| 1461 | 78204 | $18.43 | 15-Jul |
| 2111 | 89102 | $4.21 | 12-Jul |
| 6010 | 41123 | $7.31 | 21-Jul |
| 8926 | 71037 | $65.21 | 18-Jul |
| 8273 | 18509 | $24.05 | 16-Jul |
| 3001 | 99199 | $20.00 | 18-Jul |
| 2219 | 30102 | $3.19 | 14-Jul |
| 3321 | 56471 | $71.12 | 15-Jul |

Private Set Intersection

| Universal ID | Transaction Amount |
|---|---|
| 18509 | $24.05 |
| 78204 | $18.43 |
| 41123 | $7.31 |

PSI Characteristics

| PSI Cardinality | 3 |
|---|---|
| PSI Sum | $49.79 |

Party 1

Party 2

FIG. 1

SECURITY MEASURES FOR DETERMINATION OF PRIVATE SET INTERSECTIONS

CROSS-REFERENCE TO RELATED APPLICATION

This application is a National Stage Application under 35 U.S.C. § 371 and claims the benefit of International Application No. PCT/US2019/028295, filed on Apr. 19, 2019, which claims priority to U.S. Provisional Application Ser. No. 62/660,108, filed on Apr. 19, 2018. The disclosures of the prior applications, including PCT/US2019/028295 are considered part of and are incorporated by reference in their entireties in the disclosure of this application.

BACKGROUND

Organizations are commonly entrusted to manage and store sensitive and private data. For example, research institutions may collect data as part of studies or experiments undertaken by the institution, and healthcare organizations may manage data relating to the medical care and wellness of their patients.

Private data is often digitally stored on computing systems operated by or on behalf of the organization, and the organization may implement security policies designed to protect the secrecy and integrity of its stored data. Data security is a high priority for many organizations because the data may contain confidential, sensitive, or otherwise private information that may derive value for the organization, for third-parties that have an interest in the organization (e.g., customers, clients, employees), or for both. Additionally, a breach in data security can precipitate a breach of trust in the organization among those whom have entrusted their private data to the organization. Because of the sensitivity of data stored by some organizations, and the paramount concern that it be safeguarded, organizations often store their data in private databases that are isolated physically, logically, or both, from unauthorized actors.

Because organizations strive to maintain their private and sensitive data in confidence, the data may be siloed from other organizations and entities. In some instances, however, organizations and other stakeholders may benefit from sharing aspects of their data with third parties, receiving data from third parties, or both.

SUMMARY

This specification discloses systems, methods, devices, and other techniques for securely determining a private set intersection, or characteristics of a private set intersection, for data items maintained by untrusted and/or independent parties. The intersection of private data sets refers to data items that are common to each of the data sets. For example, data items for a same object or person represented in private data sets maintained by several parties may be classified as being within the intersection of the private data sets.

Determining an intersection of two parties' datasets can involve comparison of the data items from each party's set to the items in the other party's set. However, absent adequate security measures, the underlying content of the data items may be revealed to the party performing such comparisons. Therefore, traditional techniques for comparing datasets may be unacceptable if the data contains private information that cannot be revealed to other parties. The techniques disclosed in this specification provide protocols and security measures that allow parties to compare private data items without revealing the underlying content of the data items to an unauthorized party. Moreover, the techniques can provide malicious security guarantees that prevent a party from arbitrarily deviating from the protocol to learn more about another party's private data than is permitted. In other implementations, the techniques can provide covert security measures that ensure a statistically significant likelihood that a party which attempts to cheat the protocol will be caught by the other party. If a party attempts to cheat during the course of executing a private set intersection ("PSI") protocol, the other party may terminate the protocol and block further interactions with the cheating party indefinitely or for a specified period of time.

According to a first aspect there is provided a method for preserving privacy in comparing private datasets of a first computing system and a second computing system, the method comprising: identifying, by the second computing system, a first set of identifiers corresponding to records in a private database of the second computing system; for each identifier in the first set of identifiers: (i) generating, by the second computing system, an encrypted version of the identifier using a homomorphic encryption process, (ii) providing, from the second computing system and to the first computing system, the encrypted version of the identifier, (iii) receiving, by the second computing system and from the first computing system, a blinded-encrypted version of the identifier that was generated using a secret key of the first computing system, and (iv) decrypting, by the second computing system, the blinded-encrypted version of the identifier to generate a blinded version of the identifier; receiving, by the second computing system, blinded versions of a second set of identifiers corresponding to records in a private database of the first computing system; determining, by the second computing system, an intersection, or a characteristic of the intersection, of the records in the private database of the first computing system and the records in the private database of the second computing system based on matches between the blinded versions of the first set of identifiers and the blinded versions of the second set of identifiers; and providing, by the second computing system, an indication of the intersection or the characteristic of the intersection.

The method may include one or more of the following features. For each identifier in the first set of identifiers, the first computing system may generate the blinded-encrypted version of the identifier by processing the encrypted version of the identifier and the secret key of the first computing system according to a pseudo-random function. The pseudo-random function may be an oblivious pseudo-random function. The second computing system may modify the encrypted version of the identifier before providing it to the first computing system by combining the encrypted version of the identifier with a secret key of the second computing system, and wherein the first computing system generates the blinded-encrypted version of the identifier further based on the secret key of the second computing system by processing the modified encrypted version of the identifier according to the pseudo-random function. For each identifier in the first set of identifiers, the second computing system may modify the encrypted version of the identifier by homomorphically adding the secret key of the second computing system to the encrypted version of the identifier. The method may further comprise: for each identifier in the first set of identifiers, mapping by the second computing system the blinded version of the identifier to the identifier; and for each identified match between a blinded version of an identifier from the first set of identifiers and a blinded]

version of an identifier from the second set of identifiers: identifying, by the second computing system, the record in the private database of the second computing system that corresponds to the identifier that is mapped to the blinded version of the identifier from the first set of identifiers; and classifying, by the second computing system, the identified record as being within the intersection of the records in the private database of the first computing system and the records in the private database of the second computing system. The second computing system may receive, from the first computing system, the blinded-encrypted versions of the first set of identifiers in a first order that corresponds to a second order that the second computing system provided the encrypted versions of the first set of identifiers to the first computing system. The first order may be identical to the second order such that the second computing system receives, from the first computing system, the blinded-encrypted versions of the first set of identifiers in a same order that the second computing system provided the encrypted versions of the first set of identifiers to the first computing system. The method may comprise determining, by the second computing system, the characteristic of the intersection of the records in the private database of the first computing system and the records in the private database of the second computing system, without determining which records are within the intersection. The characteristic of the intersection may represent a count of a number of common identifiers included in both the first set of identifiers corresponding to records in the private database of the second computing system and the second set of identifiers corresponding to records in the private database of the first computing system. The characteristic of the intersection may represent a sum of values stored in records of the private database of the second computing system that are within the intersection of records between the private database of the first computing system and the private database of the second computing system. A first subset of identifiers from the first set of identifiers may also be included among the second set of identifiers, and a second subset of identifiers from the first set of identifiers are not included among the second set of identifiers. The method may further comprise: determining, by the second computing system, whether the first computing system blinded the encrypted versions of the first set of identifiers without deviating from a prescribed protocol; and in response to verifying that the first computing system deviated from the prescribed protocol in blinding the encrypted versions of the first set of identifiers, taking action to stop performance of the prescribed protocol. The method may further comprise: inserting, by the second computing system, dummy identifiers into the first set of identifiers, the dummy identifiers not corresponding to the records in the private database of the second computing system; and after receiving the blinded-encrypted versions of the first set of identifiers from the first computing system, verifying that the first computing system properly blinded encrypted versions of the dummy identifiers. The first set of identifiers that correspond to the records in the private database of the second computing system may identify users who were party to transactions with an entity associated with the second computing system; and the second set of identifiers that correspond to the records in the private database of the first computing system may identify users who were served digital media items of the entity associated with the second computing system.

At least one aspect may provide a computing system, comprising: a private database, on one or more computers, storing a plurality of data records, each data record including an identifier representing an identity of the data record or an identity of a user represented in the data record; one or more processors; and one or more computer-readable media having instructions stored thereon that, when executed by the one or more processors, cause performance of operations according to the first aspect.

At least one aspect may provide one or more non-transitory computer-readable media having instruction stored thereon that, when executed by one or more processors, cause the one or more processors to perform operations according to the first aspect.

Implementations of the subject matter described in this specification can, in certain instances, provide one or more of the following advantages. First, an intersection of private data items from untrusted and/or independent parties can be determined without either party learning private content of the other party's data. Second, a cardinality or sum of associated values of an intersection of private data items from untrusted and/or independent parties can be determined without either party learning private content of the other party's data, and without either party learning which data items are within the intersection. Third, untrusted and/or independent parties may execute a protocol to determine an intersection, or characteristic of the intersection, of the parties' private data items while providing semi-honest security guarantees, malicious security guarantees, or covert security guarantees. The techniques may allow either party, for example, to detect with high likelihood whether the other party has breached any or some steps of a PSI protocol by inserting dummy data items into the set that is subject to comparison. Fourth, the parties can execute a PSI protocol to determine the intersection, or characteristic of the intersection, of private data items without requiring a common RSA modulus generated by a trusted third party. Additional features and advantages will be apparent to those of ordinary skill in the art in view of the entire specification, the drawings, and the claims.

DESCRIPTION OF DRAWINGS

FIG. 1 is a conceptual diagram of a computing environment configured to securely determine an intersection of private data items stored in databases of untrusted parties.

DETAILED DESCRIPTION

Figure 2:
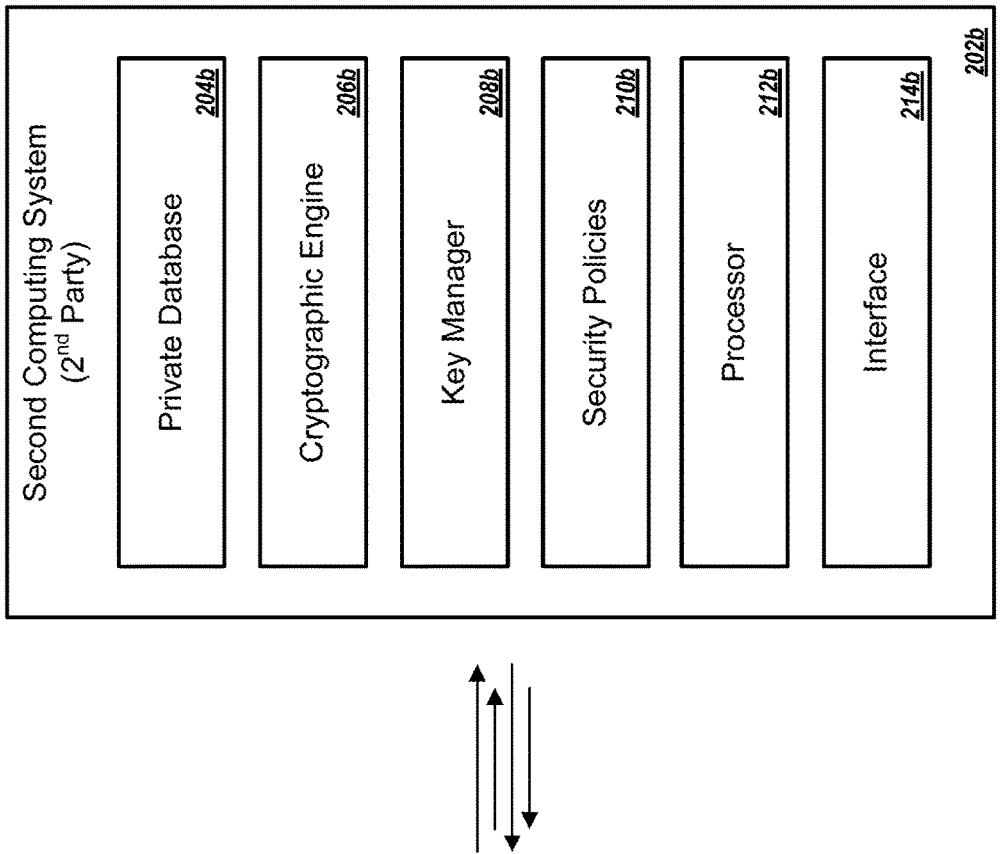
FIG. 2 depicts a computing environment including first and second computing systems configured to execute protocols for the secure determination of a private set intersection for private data stored in databases of untrusted parties.
Figure 2:
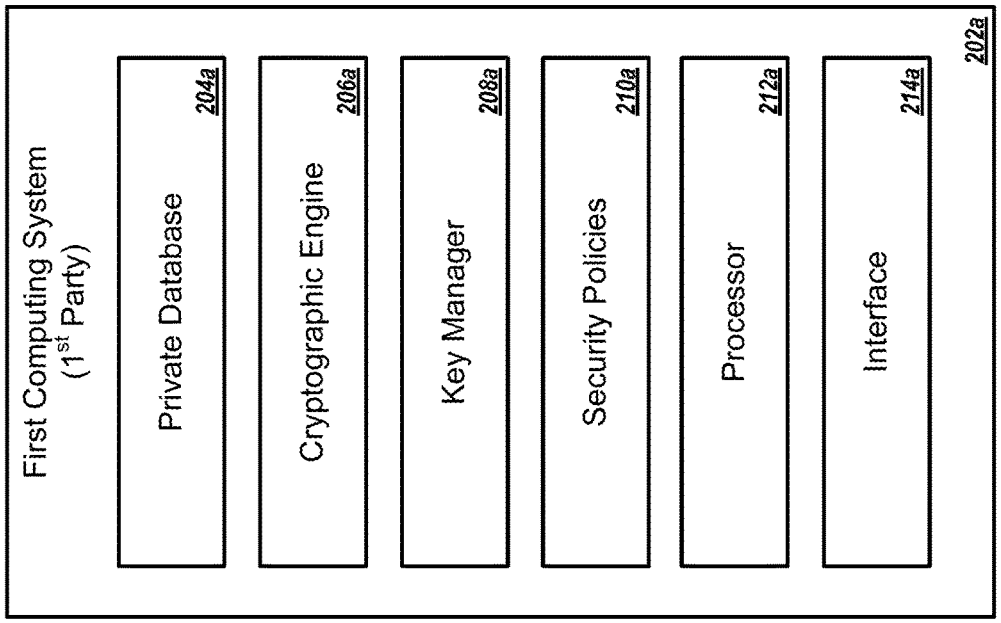

This specification discloses computer-based systems, methods, devices, and other techniques that facilitate the controlled exchange of information from private datasets between independent parties, without revealing information that could allow either party to discern private aspects of the data shared by the other. More specifically, the techniques disclosed herein can be applied to determine the intersection of items held in two or more parties' private datasets, without any party revealing the underlying content of their private data. For instance, if two parties have records of data representing a same user, data representative of the user may be classified within the private set intersection of the parties, and the fact that the user is represented in both parties' private datasets can be determined without revealing the underlying content of each parties' set. These and additional aspects of the disclosure are described in further detail with respect to the figures.

Referring to FIG. 1, a conceptual diagram is shown of an environment 100 for which the intersection of two parties' private databases 104a, 104b can be securely determined. The environment 100 includes a first computing system 102a and a second computing system 102b. The first computing system 102a is operated by or on behalf of a first party, while the second computing system 102b is operated by or on behalf of a second party. Computing systems 102a and 102b can each be implemented on one or more computers in one or more locations. The first and second parties may, respectively, be a person, business, university, government, or other organization or entity that maintains private data concerning the activities of that party. For instance, a business may maintain private data about sales, customer lists, trade secrets, and operations, while a university may maintain private data about its faculty and students such as performance records, academic and disciplinary reports, and the like. The first and second parties are generally separate from each other, and each manages its private data independently of the other. Nonetheless, the two parties may benefit from comparing their datasets and identifying common items therein (i.e., determining the private set intersection), or determining characteristics of the intersection such as the number of common items in the datasets or a sum of values associated with the common items.

For example, in FIG. 1, the first party operating first computing system 102a may be an online distributor of digital media items. As part of its distribution scheme, the first computing system 102a stores digital media items (e.g., images, video, audio files, or text) submitted by third-party providers, and places the digital media items in web pages, applications, or other interfaces that have been designed to incorporate third-party digital media items. For example, a news website may provide slots in its web pages that are reserved for third-party digital media items, and the distribution system (e.g., first computing system 102a) may select particular digital media items submitted by third parties to fill these slots each time a web page from the site is served to a user. The items selected may be deemed relevant to the content of the news site and/or the interests of the user to whom the web page is served, for example.

The first computing system 102a maintains a private database 104a storing records of digital media items served to particular users. As shown in FIG. 1, each record in the private database 104a of the first party includes, at least, a device ID, a universal ID, a provider ID, and a date stamp, and each record corresponds to a particular instance of a third-party digital media item being served to a user. For example, the first record from the top of the representation of database 104a indicates that a digital media item submitted for distribution by provider A was served on July 15 to a user device identified by device ID G10967. The next record from the top indicates that a digital media item submitted for distribution by provider B was served on July 14 to a user device identified by device ID B632519. Although several records are shown in FIG. 1 for illustration, in practice, the private database 104a may include hundreds, thousands, millions, or even billions of records depending on the scale of the distribution scheme.

The database 104a also includes a 'Universal ID' field. The universal ID is an identifier that is shared or otherwise commonly known by two or more parties to identify a particular person, place, or thing. In the example of database 104a, the universal ID identifies the user that was served a particular digital media item. In some implementations, the first computing system 102a translates or maps the device ID and/or other heuristics to a universal ID for the user recipient of a served digital media item. For instance, the first computing system 102a may use the device ID and IP address of the user requesting a third-party digital media item to recognize the user and access that user's universal ID. Other parties who may interact with the same users may also refer to those users by their universal IDs. In some implementations, the universal IDs may be issued by an independent authority or assigned by means that are available to any party. For example, the universal ID may be the IP address of a user who visits the respective websites of two or more parties. Each party's site may separately record which users visited their sites based on their IP addresses, thereby providing universal or common identifiers for the user to each party.

The second computing system 102b maintains a private database 104b storing records of transactions that various users engaged in with the second party. Each record corresponds to a particular transaction and includes, for example, a client ID, a universal ID, a transaction amount, and a stamp indicating a time and/or date of the transaction. The client ID represents an internal identifier for the entity (e.g., a client, customer, or vendor) that was party to the transaction. The client ID is mapped to a universal ID for the entity, so that both the first party and the second party may refer to a same entity by an identifier that is known to both parties.

Moreover, in the example of FIG. 1, the second party corresponds to provider 'B' in the private database 104a of the first party. That is, the second party is a party that submitted digital media items to the first party for distribution, and the first party served the second party's digital media items for presentation to end users, such as by inserting the items in designated content slots in websites, mobile applications, or other publisher content.

The first party, second party, or both, may desire to understand how effective the digital media items that the first party served on behalf of the second party were at driving end users to initiate actual transactions with the second party. The effectiveness of digital media item placement may be quantified by a measure referred to as a conversion rate. A conversion represents an instance where the presentation of a digital media item to a user led the user to initiate a transaction, or to initiate other types of qualifying interactions, with a provider of the digital media item (e.g., the second party in FIG. 1). A conversion may be counted by identifying users who initiated a transaction with a provider of a digital media item within a pre-determined amount of time since the digital media item was served and presented to the user.

Although the first party, the second party, or both parties may desire to identify conversions, neither party has access to all the data that is required to determine a conversion. The first party, for instance, knows which digital media items were served to which end users on behalf of which content providers, but does not know which end users then initiated transactions with the content providers. Likewise, the second party knows which entities initiated a transaction with the second party (e.g., purchased goods or services from the second party), but does not know which of those entities correspond to end users who were served the second party's digital media items.

The techniques disclosed in this specification may permit the first and second parties to compare records from their private databases 104a and 104b so that they can determine the information required to identify conversions and/or determine a conversion rate, without revealing the underlying content of the private records and, in some implementations, without revealing the identities of end users represented in the databases 104a, 104b to the other party. For example, conversions may be determined by identifying qualifying records in private database 104a that have a same universal identifier (e.g., user identifier) as records in private database 104b. The records of databases 104a, 104b that share the same universal identifier may be referred to as the private set intersection. Specifically, to determine conversions, the first computing system 102a and second computing system 102b may filter databases 104a and 104b so that only records from each database that represent possible conversions are compared to each other (e.g., records from first database 104a that correspond to provider B/the second party are compared to records from second database 104b for transactions that occurred within a pre-determined time after users were served the second party's digital media items). In FIG. 1, three pairs of records from private databases 104a and 104b occur in the private set intersection 106. The first computing system 102a and/or the second computing system 102b can determine the private set intersection 106 by comparing blinded values of the universal identifiers from each database 104a, 104b. If a match is determined among the blinded identifiers for a pair of records, then the system 102a or 102b classifies the corresponding records for the blinded identifiers as being within the private set intersection 106. Each record within the intersection 106 can, for example, represent a conversion.

Further, as explained in detail below with respect to FIGS. 4 and 5, in some implementations the first system 102a, the second system 102b, or both can determine one or more characteristics 108 of the intersection 106 while preventing either party from discerning which records are actually within the intersection 106. The characteristics 108 can include a cardinality of the intersection 106, which represents a count of a number of items within the intersection 106. In some implementations, the characteristics 108 include a sum of associated values of items in the intersection 106, such as a sum of the transaction amounts for the records in the intersection 106. Thus, the cardinality of the intersection 106 for the records shown in FIG. 1 is '3', and the sum of transactions for the records in intersection 106 is $49.79. By determining characteristics 108 of the intersection 106, useful information about the intersection 106 can be determined while further preserving the privacy of the parties' data since neither party determines the underlying content of the other parties' records or identifies which records are within the intersection 106.

The techniques disclosed herein are not limited to determining conversions. The determination of private set intersections, or characteristics of such intersections, may generally be applied in any situation where two parties seek to compare sensitive data without breaching privacy constraints associated with the data. For example, an employer who is constructing a health insurance plan for its employees may use the techniques herein to collaborate with healthcare providers to obtain an indication of how many employees have sought medical services over a period of time or a total spend of the employees on medical services over a period of time.

Turning to FIG. 2, a computing environment 200 is depicted for the determination of intersections, or characteristics of intersections, in private datasets of independent parties. The environment 200 includes a first computing system 202a and a second computing system 202b. The first computing system 202a is operated by or on behalf of a first party, and the second computing system 202b is operated by or on behalf of a second party. The first and second systems 202a and 202b may be physically, geographically, and/or logically separated from each other, and each system 202a and 202b can include one or more computers operating in a centralized or distributed manner in one or more locations.

Each of the first and second computing systems 202a, 202b is configured to communicate with the other over a communication channel, such as a secure Internet connection. The systems 202a, 202b may be configured differently from each other, but may include some common components to carry out operations for determining a private set intersection, and/or characteristics of the intersection. For illustration, these components 204a-214a will be described with respect to the first party computing system 202a, but it should be understood that the second party computing system 202b may include corresponding components 204b-214b configured to carry out corresponding operations to the components 204a-214a of the first party computing system 202a.

The first party computing system 202a can include a private database 204a, a cryptographic engine 206a, a key manager 208a, a security policy repository 210a, a processor 212a, and a communication interface 214a.

The private database 204a stores data items for the first party. All or some of the data items may be deemed "private," in that they represent information of a sensitive character. Private data items may pertain, for example to personal information of users, business confidential information, patient medical information, or the like, and access to private data items may be restricted. In some implementations, the private database 204a stores information in a structured manner, such as records in a relational database. The database 204a may then include one or more tables storing records of private data items according to a defined schema, and may further include a database management system that manages modifications, access to, and querying of the one or more tables. The database 204a may be implemented on one or more processors of the system 202a, and the data may be stored on one or more memory devices of the system 202a.

Cryptographic engine 206a is configured to perform cryptographic operations on data items from the private database 204a. For example, the cryptographic engine 206a may apply homomorphic encryption on private data items, decrypt data items, and apply blinding operations to data items according to the processes and techniques described with respect to FIGS. 3-9. The cryptographic engine 206a can use one or more keys in performing cryptographic operations. The cryptographic engine 206a may retrieve an appropriate key for a given cryptographic operation from the key manager 208a. The key manager 208a may generate, exchange, store, and/or destroy keys for use by the cryptographic engine 206a. In some implementations, the key manager 208a is provided in a hardware security module that includes hardware-based security measures to mitigate or detect unauthorized access or tampering with keys maintained by the key manager 208a.

The first computing system 202a may be configured to operate according to a specified security policy. Configuration files that define one or more security policies can be stored in a security policy repository 210a on one or more memory devices of the system 202a. In some implementations, the protocol that the system 202a adheres to during interactions with the second computing system 202b are governed based on the parameters of a selected security policy. The system 202 may implement different security models based on which security policy the first party system 202a selects for a given interaction with the second party system 202b. For example, a first security policy may instruct the first system 202a to implement a "semi-honest" security model, which ensures that the parties to the interaction (e.g., the first and second parties) only learn permissible types of information about the private data of the other party if they follow the protocol steps faithfully. A second security policy may instruct the first system 202b to implement a "malicious" security model, which ensures that the parties to the interaction only learn permissible types of information about the private data of the other party, even if they arbitrarily deviate from the protocol. A third security policy, in contrast, may instruct the first system 202c to implement a "covert" security model, which ensures that the parties to the interaction only learn permissible types of information about the private data of the other party if they follow the protocol steps faithfully, but if a party deviates from the protocol the breach will be detected with some probability p (e.g., 99-percent, tunable). For instance, if one party attempted to defraud the other party and deviate from an interaction protocol to impermissibly learn private information about the other party's data, the party acting in bad faith would be prevented from deviating the protocol and achieving its objectives under a malicious security model, while that same party under a covert security model may be capable of learning more than permitted, but would risk detection. If detected, the other party may take remedial action to recover any breached information, and may take punitive action such as refusing future interactions with the malicious party.

The first party computing system 202a includes a processor 212a. A singular processor 212a is depicted in the figure, but in other implementations the system 202a may include multiple processors. The processor 212a, or processors, may be embodied in one or more physical processing devices, and may include a combination of hardware, software, and/or firmware. The processor 212 may execute computer-readable instructions to implement any component of the first system 202a, and may execute one or more computer programs that are operable to cause the first system 202a to carry out the techniques disclosed herein for determining a private set intersection of items in private databases 204a and 204b, and/or that operable to cause the first system 202a to determine characteristics of the private set intersection.

The interface 214a is a communication interface enabling the first computing system 202a to communicate with the second computing system 202b and, optionally, with one or more additional computing systems. For example, encrypted and blinded data items from the private database 204a may be transmitted over a communication channel (e.g., one or more physical or wireless networks) to the second computing system 202b, and encrypted and blinded data items from the private database 204b may be received over the communication channel from the second computing system 202b.

Figure 3:
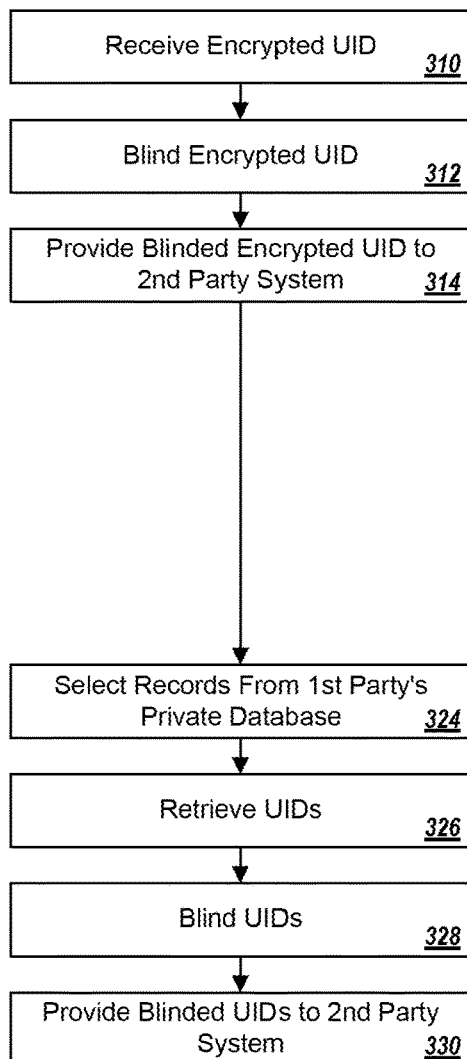
FIG. 3 depicts a flowchart of an example process for determining an intersection of private data items maintained by untrusted parties.
Figure 3:
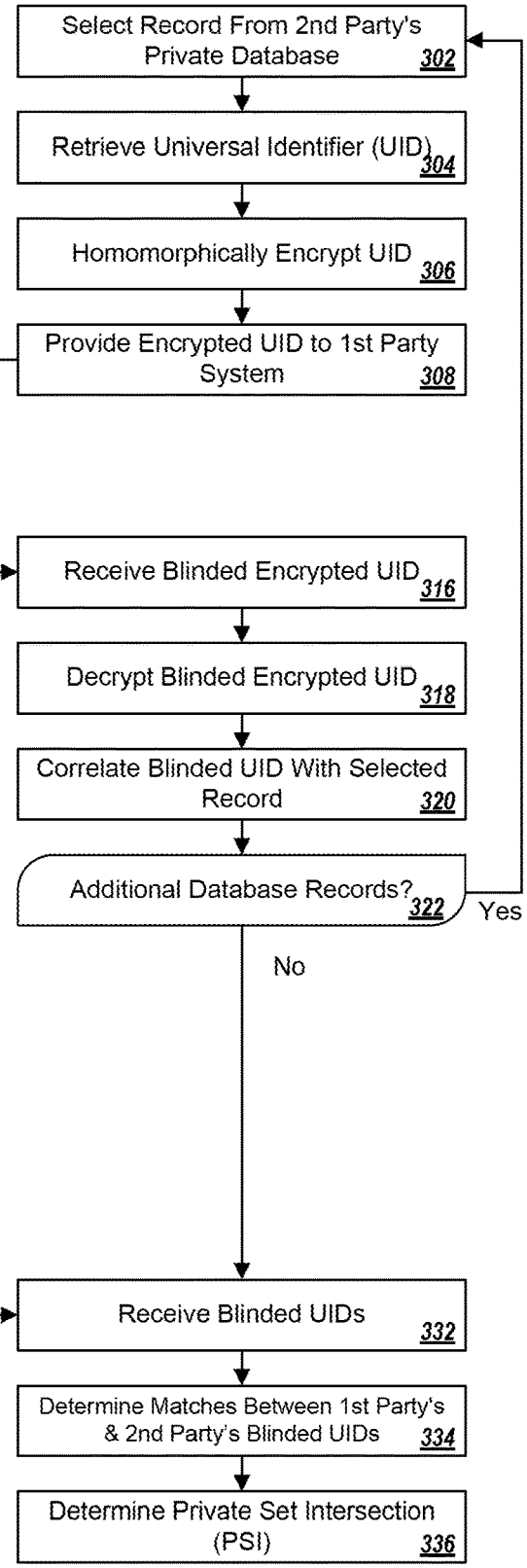

FIG. 3 is a flowchart of an example process 300 for determining an intersection of private data items maintained by independent and/or untrusted parties. The process 300 is performed by a first party computing system (e.g., systems 102a or 202a) on behalf of a first party and a second party computing system (e.g., systems 102b or 202b) on behalf of a second party.

At stage 302, the second party system selects a set of records from a private database to be the subject of comparison with records from a private database of the first party system. In some implementations, the second party system selects the records by querying the private database for records that match one or more search criteria. For example, if the goal of the process 300 is to identify conversions over a certain period of time, the second party system may select records corresponding to transactions that occurred within that time period.

At stage 304, the second party system selects a particular record from the set identified at stage 302 and determines a universal identifier associated with the record or with an entity represented in the record. The universal identifier is an identifier that is used by both the first party computing system and the second party computing system to refer to like things. For example, an end user who was served digital media items by a content distribution platform of the first party computing system, and who then purchased a good or service from the second party, may be identified using the same universal identifier in the private databases of both the first party computing system and the second party computing system.

At stage 306, the second party system 306 encrypts the universal identifier. The encryption can be performed by a cryptographic engine of the second party system. Moreover, in some implementations, the cryptographic engine encrypts the universal identifier using a homomorphic technique. An example homomorphic encryption technique is the Camenisch-Shoup encryption scheme. By encrypting the universal identifier homomorphically, operations can be performed on the ciphertext (i.e., the encrypted version of the universal identifier) that are preserved in the plaintext when decrypted. For instance, the same or corresponding result would be produced by performing certain operations on a plaintext universal identifier as if the operations were performed on a homomorphically encrypted version of the universal identifier and then decrypted.

At stage 308, the second party system transmits the encrypted universal identifier to the first party system, and the first party system receives the encrypted universal identifier at stage 310. Notably, the first party system does not possess the requisite key to decrypt the universal identifier, and so the first party system is unable to determine the plaintext value of the universal identifier.

At stage 312, the first party system performs a blinding operation on the encrypted universal identifier. The blinding operation may be performed by the cryptographic engine of the first party system. Generally, the blinding operation is a cryptographic operation that blinds or masks the underlying content of the encrypted universal identifier so that data items of the first party system and the second party system can be compared in a blinded space rather than plaintext. In some implementations, the first party system blinds the encrypted universal identifier using an oblivious pseudorandom function. The oblivious pseudorandom function is based on a secret key possessed by the first party system, but not by the second party system. Alternatively, the oblivious pseudorandom function can be performed using a key that is combined based on (i) a first secret portion contributed by the first party system but unknown to the second party system and (ii) a second secret portion contributed by the second party system but unknown to the first party system.

At stage 314, the first party system transmits the blinded encrypted version of the universal identifier to the second party system, and it is received by the second party system at stage 316. At stage 318, the second party system (e.g., the cryptographic engine of the second party system) decrypts the blinded encrypted universal identifier using a secret decryption key privately held by the second party system to construct a blinded version of the universal identifier. Because the decryption was to reverse a homomorphically encrypted value, the result of decrypting the blinded encrypted version of the universal identifier corresponds to the result of not having homomorphically encrypted the universal identifier at all, and therefore decrypting the blinded encrypted version of the universal identifier serves to generate a merely blinded version of the universal identifier.

At stage 320, the second party system stores a correlation between the un-blinded or plaintext version of the universal identifier and the blinded version of the universal identifier for the record that was selected at stages 304. At stage 322, the second party system checks whether the universal identifiers of any additional records from the set of records identified at stage 302 remain to be blinded. If so, the process 300 returns to stage 302 and the universal identifier for a next selected record from the set is blinded in the same manner. The second party system continues to provide universal identifiers to be blinded from the selected set of records until all of the records in the set are exhausted.

Meanwhile, at stage 324, the first party system selects records from its private database that are to be subject to comparison with the selected records from the private database of the second party system. The first party system may select a set of records, for example, that represent end users who were served digital media items on behalf of the second party during a specified period of time, for the purpose of identifying conversions. The first party system retrieves universal identifiers for the selected records (326), and blinds the universal identifiers (328) using the same blinding operation and key that were used to blind the encrypted versions of the universal identifiers from the private database of the second party system (328). In some implementations, the universal identifiers are blinded using an oblivious pseudorandom function. At stage 330, the first party system transmits the blinded universal identifiers for each selected record from the first party's private database to the second party system, and at stage 332 the second party system receives the blinded universal identifiers.

Having obtained the blinded identifiers for the selected records from the private databases of the private databases of both the first and second party systems, the second party system can determine the private set intersection of the records. At stage 334, the second party system compares the blinded identifiers from each party's private databases and determines whether there are any matches among the blinded identifiers. Each identified match signifies corresponding records between the first and second parties' private databases that refer to the same universal identifier. For example, each match can represent a conversion where a user that was served a digital media item of the second party by an online distribution platform associated with the first party later initiated a transaction with the second party within a specified period of time. To finally determine which records are within the private set intersection, the second party system at stage 336 uses the correlation data that was stored at stage 320 to lookup the unblinded universal identifiers and/or database records from the second party's private database that correspond to the blinded universal identifiers that were matched with blinded universal identifiers from the first party's private database.

Notably, the second party system in the process 300 of FIG. 3 was capable of identifying individual records from the second party's private database within the intersection of records from the first party's private database by correlating blinded identifiers received from the first party system with the unblinded version of the identifier. The second party system can determine the correlation so long as it receives the blinded versions (or blinded encrypted versions) of the universal identifiers from the first party system in a same or corresponding order as they were provided to the first party system. However, in some cases, determination of particular records in the intersection may be unnecessary. The parties may instead seek to determine a characteristic of the intersection rather than determining the specific records that constitute the intersection. Determining a characteristic of the intersection, such as cardinality or a sum of associated values of records in the intersection, can be beneficial to further protect the sensitivity of the compared data because neither party identifies the individual records within the intersection.

Figure 4:
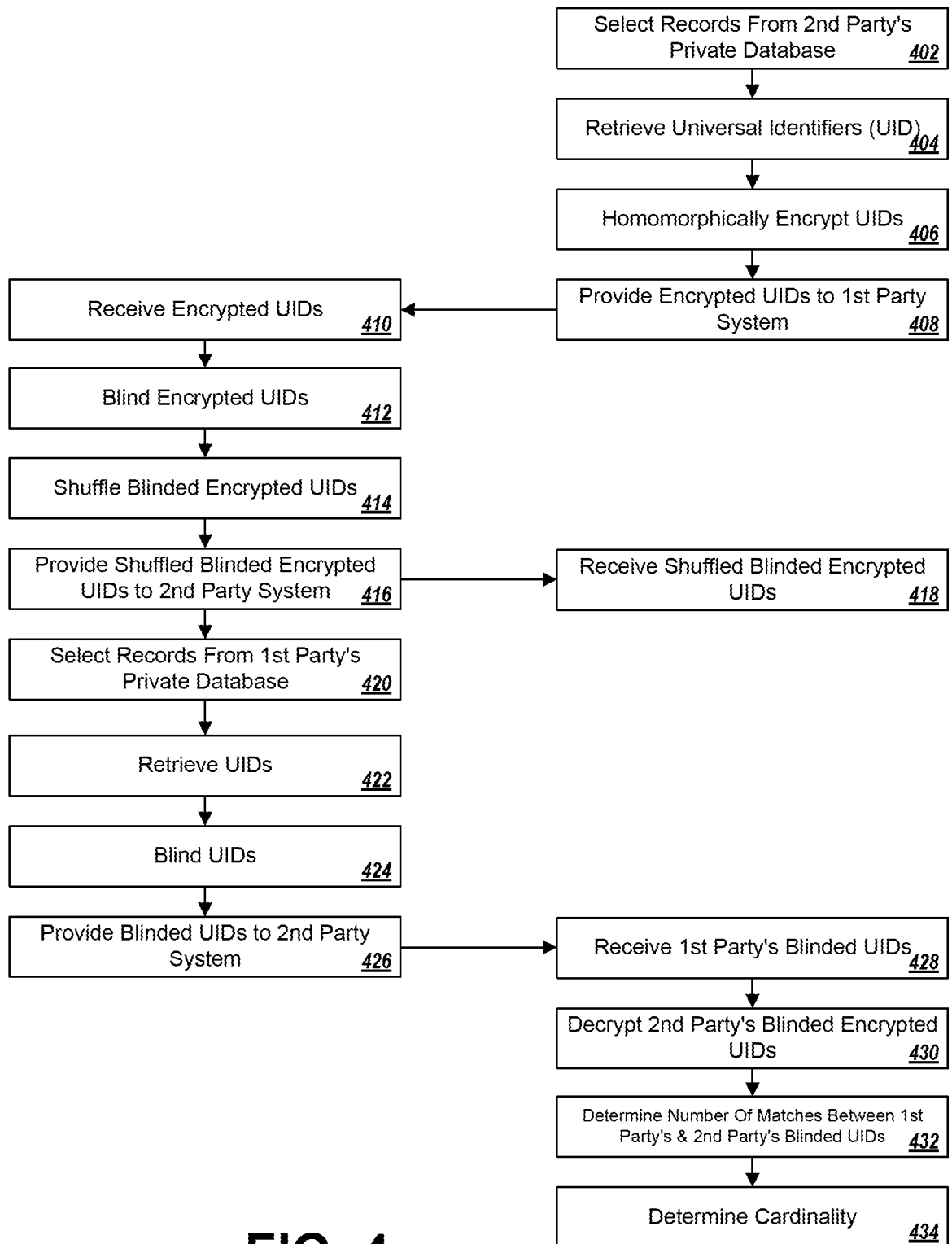
FIG. 4 depicts a flowchart of an example process for determining the cardinality of an intersection of private data items maintained by untrusted parties.

FIG. 4 depicts a flowchart of a process 400 for determining the cardinality of a private set intersection. In contrast to the process 300 of FIG. 3, the second party is unable to discern which records are within private set intersection, even though the cardinality is determined. The second party is prevented from identifying the constituent records of the intersection because the first party system shuffles the blinded identifiers of the second party before they are returned to the second party system. The second party is therefore unable to correlate the blinded identifiers received from the first party system with the unblinded identifiers provided to the first party system. The operations of process 400 can proceed as follows.

At stage 402, the second party system selects records from its private database that meet one or more selection criteria. For each selected record, the second party system retrieves a universal identifier associated with the record (404). The second party system then homomorphically encrypts each universal identifier (406) and transmits the encrypted versions of the universal identifiers to the first party system (408). At stage 410, the first party system receives the encrypted versions of the second party's universal identifiers. The first party system applies a blinding operation to each of the encrypted versions of the second party's universal identifiers to generate blinded encrypted versions of the second party's universal identifiers (412). The first party system randomly shuffles the blinded encrypted versions of the second party's universal identifiers (414), and transmits the blinded encrypted versions of the identifiers to second party system (416). The second party system receives the blinded encrypted versions of the second party's universal identifiers in shuffled order at stage 418. Meanwhile, at stage 420, the first party system selects records from its private database that meet one or more selection criteria, and retrieves a universal identifier associated with each record (422). The first party system then applies a blinding operation to each of the first party's universal identifiers to generate blinded versions of the first party's universal identifiers (424). The first party system transmits the blinded versions of the first party's universal identifiers to the second party system (426), which are then received by the second party system (428). The second party system decrypts the blinded encrypted versions of the second party's universal identifiers to generate blinded versions of the second party's universal identifiers (430), and then compares the blinded versions of the first party's universal identifiers with the blinded versions of the second party's universal identifiers (432). Any matches determined between the blinded versions of the first and second parties' universal identifiers are determined to be in the private set intersection. As a result of the shuffle, the second party system cannot correlate the matched blinded versions of the universal identifiers with unblinded versions, but it can determine the cardinality of the intersection by counting the number of matched blinded identifiers (434).

Figure 5:
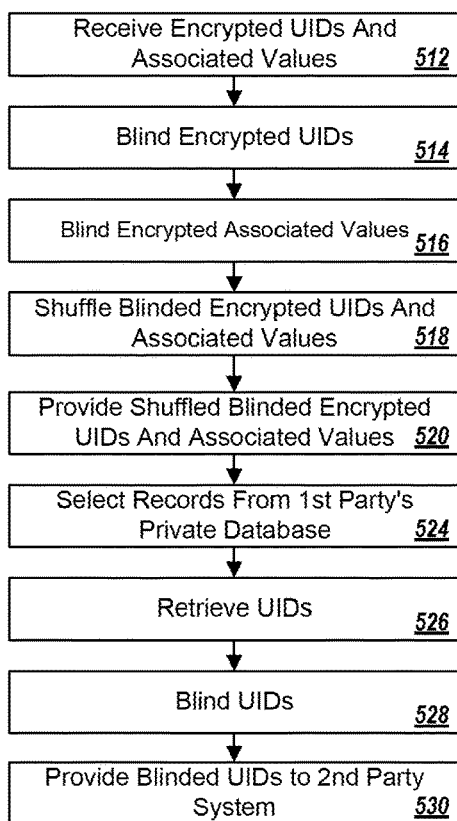
FIG. 5 depicts a flowchart of an example process for determining the sum of associated values of an intersection of private data items maintained by untrusted parties.
Figure 5:

FIG. 5 depicts a flowchart of an example process 500 for determining the sum of values associated with records in a private set intersection while preserving privacy. The process 500 can be carried out by respective computing systems of untrusted parties such as systems 102a, 102b or systems 202a, 202b. In some implementations, the process 500 allows the second party to determine the sum of values associated with records in a private set intersection without either party identifying the individual values or records from which the sum is determined. That is, rather than the identifying each record in the intersection as described with respect to FIG. 3 and then determining the sum of the values associated the identified records, the process 500 determines the sum of values in a blinded space so that the parties need not identify which records constitute the private set intersection. These techniques can be usefully applied, for example, in the context of conversions to determine a total value of transactions initiated by users who were served digital media items by a first party in an online distribution platform.

At stage 502, the second party system selects records from its private database that meet one or more selection criteria. For each selected record, the second party system retrieves a universal identifier associated with the record and an additional value associated with the record (504). The second party system then homomorphically encrypts each universal identifier (506), homomorphically encrypts the additional values associated with the records (508), and transmits the encrypted versions of the universal identifiers and associated values to the first party system (510). At stage 512, the first party system receives the encrypted versions of the second party's universal identifiers and the encrypted versions of the associated values of the second party's records. The first party system applies a blinding operation to each of the encrypted versions of the second party's universal identifiers to generate blinded encrypted versions of the second party's universal identifiers (514), and applies a blinding operation to each of the encrypted versions of the associated values of the second party's records (516). The first party system randomly shuffles the blinded encrypted versions of the second party's universal identifiers (518), but maintains the correspondence between the identifiers and their associated values. The first party system then transmits the blinded encrypted versions of the identifiers and their corresponding blinded encrypted associated values to the second party system (520). The second party system receives the blinded encrypted versions of the second party's universal identifiers and the blinded encrypted associated values in shuffled order at stage 522. Meanwhile, at stage 524, the first party system selects records from its private database that meet one or more selection criteria, and retrieves a universal identifier associated with each record (526). The first party system then applies a blinding operation to each of the first party's universal identifiers to generate blinded versions of the first party's universal identifiers (528). The first party system transmits the blinded versions of the first party's universal identifiers to the second party system (530), which are then received by the second party system (532). The second party system decrypts the blinded encrypted versions of the second party's universal identifiers to generate blinded versions of the second party's universal identifiers (534), and then compares the blinded versions of the first party's universal identifiers with the blinded versions of the second party's universal identifiers (536). Any matches determined between the blinded versions of the first and second parties' universal identifiers are determined to be in the private set intersection. As a result of the shuffle, the second party system cannot correlate the matched blinded versions of the universal identifiers with their unblinded versions, but it can determine the sum of the values associated with the records in the private set intersection. To determine the sum, the second party system decrypts the blinded encrypted versions of the associated values to generate blinded versions of the associated values (538). The second party system sums the blinded versions of the associated values, and then removes a blinding factor from the sum to determine the un-blinded sum of the associated values of the records in the private set intersection (540).

PSI Protocol Overview

Some implementations of the techniques described herein compute the private set intersection (PSI) using an oblivious-pseudorandom function (PRF). More specifically, the techniques can use the PRF $f_k(m)=g^{1/(k+m)}$ mod p, where p is a prime, and g is a generator for a large prime order subgroup of $Z^*_p$. The PRF can be securely and obliviously computed by two parties, one holding the key k, the other holding the message m. This oblivious-PRF computation can form the core of the PSI protocol.

Figure 6:
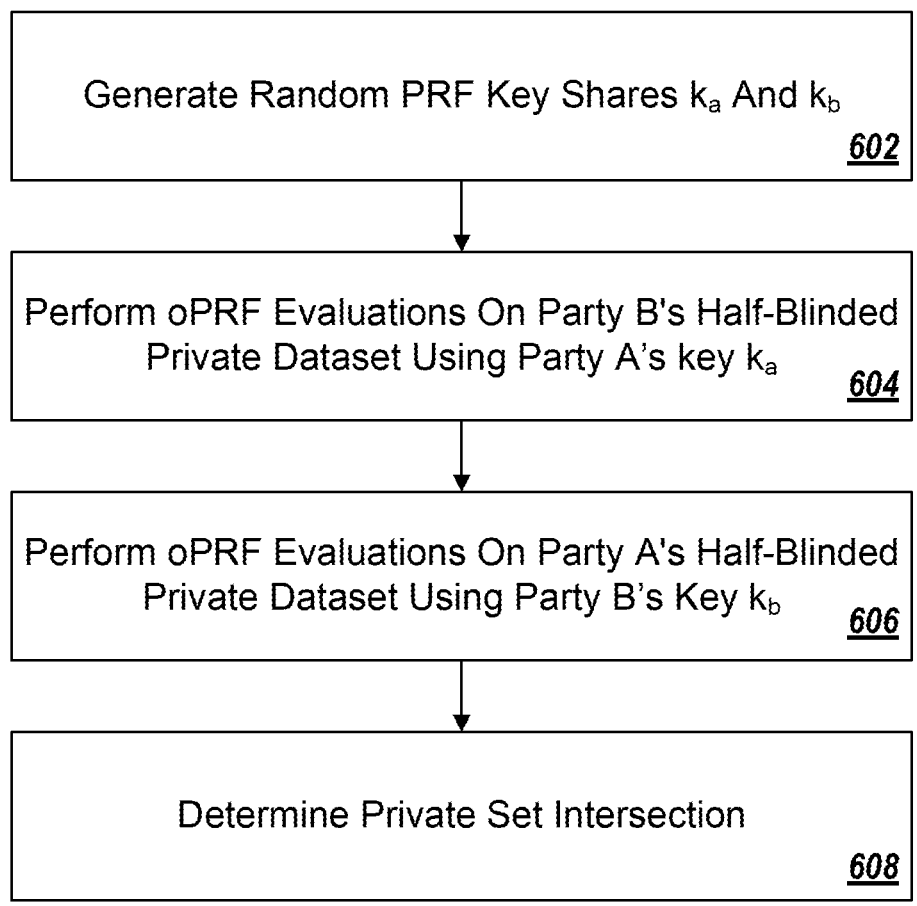
FIG. 6 depicts a flowchart of an example protocol for determining a private set intersection using an oblivious pseudo-random function.

The outline of the PSI protocol 600, using the oPRF as a subprotocol, is represented in the flowchart depicted in FIG. 6. Let A and B be two parties with individual datasets $D_a=(a_1 \ldots, a_n)$ and $D_b=(b_1, \ldots, b_m)$ respectively, and both parties want to learn $D_a \cap D_b$.

At stage 602, A and B generate random PRF key shares $k_A$ and $k_B$ respectively. The goal is to evaluate $f_{k^*}$ on each of their datasets, where $k^*=k_A+k_B$.

At stage 604, A and B run m parallel oPRF evaluations with A as the key holder, using $k_A$, and B as the message holder, using half-blinded messages $(k_B+b_1, k_B+b_2, \ldots, k_B+b_m)$. At the end of these evaluations, both parties learn $f_{k^*}(B)=\{g^{1/(k\_A+k\_B+b\_i)} \text{ mod } p \text{ for all } i \in [m]\}$.

At stage 606, A and B then run n parallel oPRF evaluations in the reverse direction, with B as the key holder, using $k_B$, and A as the message holder, using half-blinded messages $(k_A+a_1, k_A+a_2, \ldots, k_A+a_n)$. After these evaluations, both parties learn $f_{k^*}(A)=\{g^{1/(k\_A+k\_B+a\_j)} \text{ mod } p \text{ for all } j \in [n]\}$.

At stage 608, A and B determine the PSI by taking the intersection of outputs of from stages 604 and 606. That is, A computes the items in the intersection to be $\{a_j:f_k^*(a_j) \in f_k^*(B)\}$, and B computes the items in the intersection to be $\{b_i:f_k^*(b_i) \in f_k^*(A)\}$.

Figure 7:
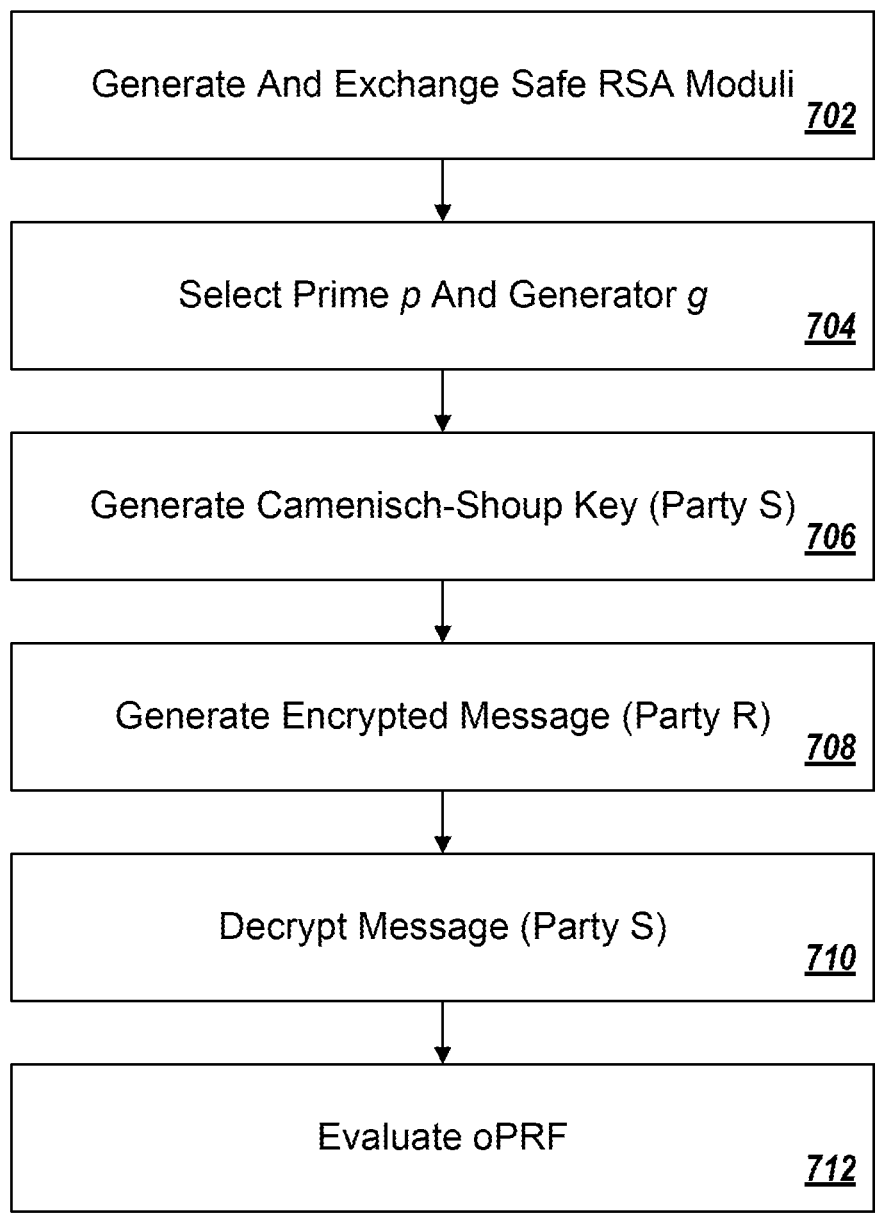
FIG. 7 depicts a flowchart of an example sub-protocol for determining a private set intersection.
Figure 8:
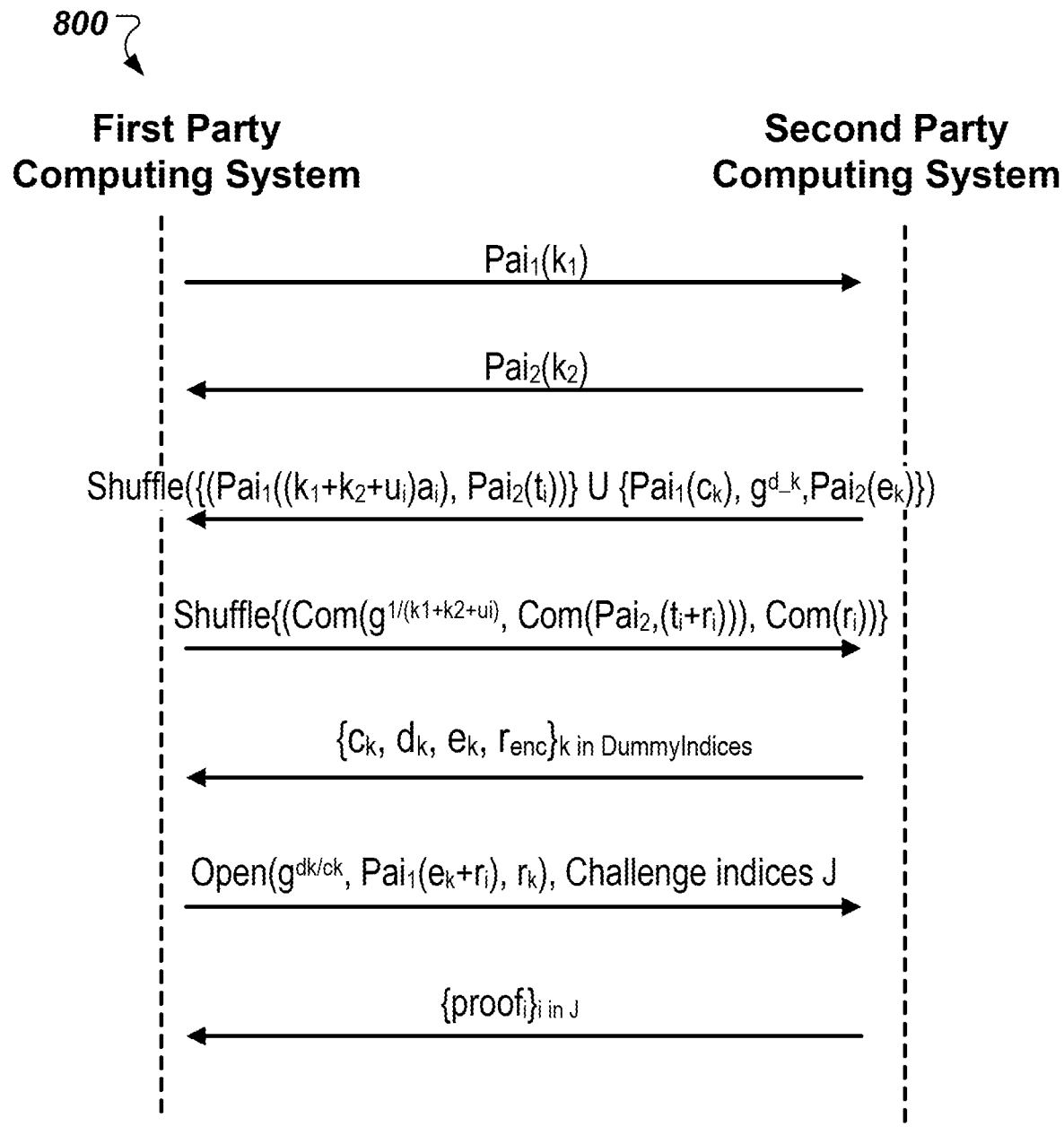
FIG. 8 depicts a swim-lane diagram for a start-of-day protocol using dummy-based covert security.
Figure 9:
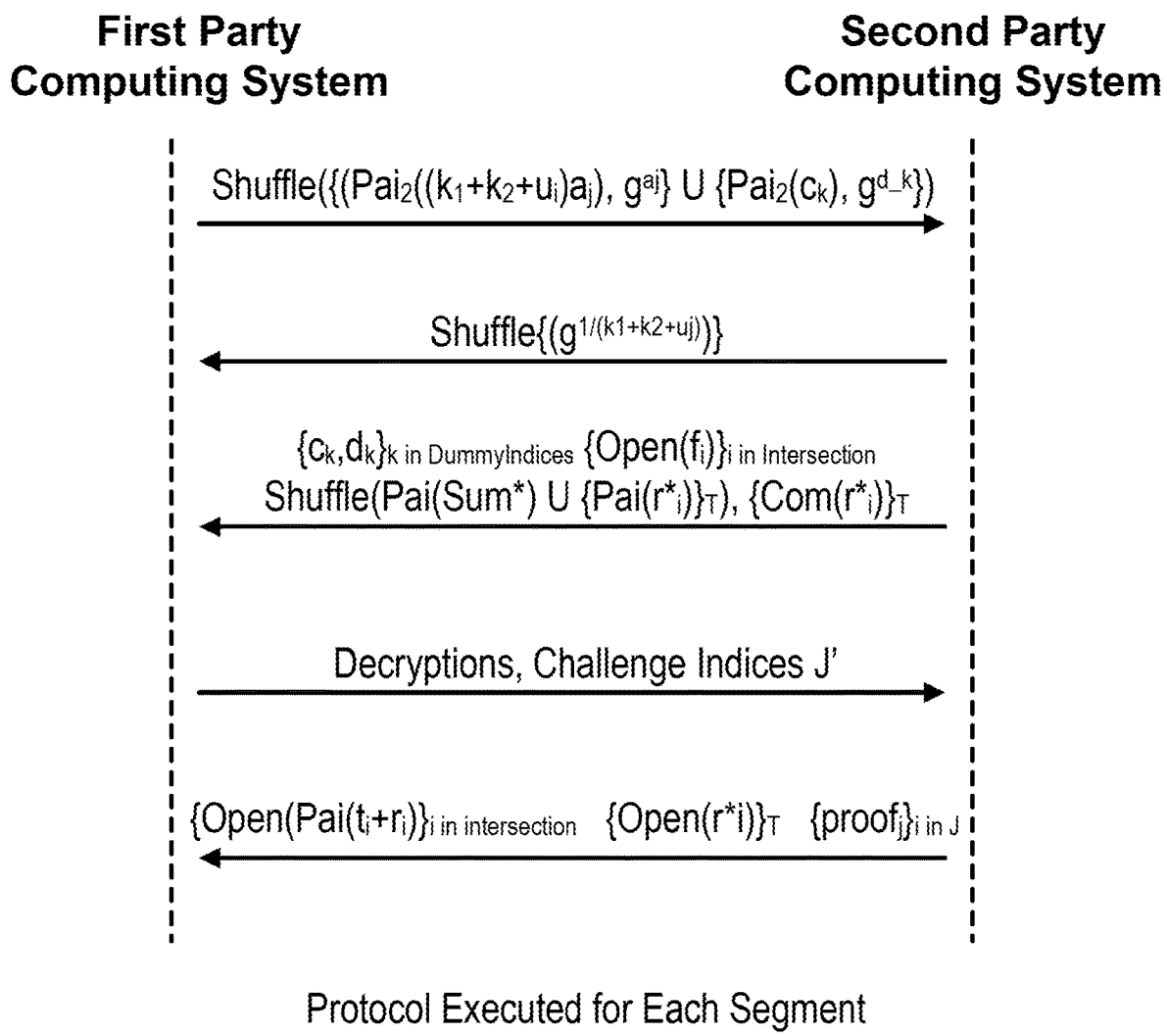
FIG. 9 depicts a swim-lane diagram for a per-segment protocol using dummy-based covert security.

The outline of the oPRF subprotocol 700 is represented in the flowchart depicted in FIG. 7. Let S and R be two parties, with S holding a PRF key k, and R holding a message m, and both parties want to compute $f_k(m)$.

At stage 702, S and R each generate sufficiently large safe RSA moduli $n_S$ and $n_R$ respectively, and send the moduli to each other. They also each generate $g_S$, $h_S$ and $g_R$, $h_R$, random generators for the large composite-order subgroups modulo $n_S$ and $n_R$, respectively. S proves that $g_S$ lies in $<h_S>$, and R proves that $g_R$ lies in $<h_R>$.

At stage 704, S and R also select a prime p=kq+1, and a generator g with ord g=q in $Z^*_p$.

At stage 706, S generates a Camenisch-Shoup key ($pk_S$, $sk_S$) for modulus $n_S$^2, and sends R an encryption C(S,k) of k under $pk_S$. S further proves to R that S knows k underlying the encryption, and that k is of the correct size (using $n_R$ as the commitment modulus in a Camenisch-Shoup style proof of knowledge). This operation also commits S to the key k.

At stage 708, R generates an encryption C(S,m) of its message m under $pk_S$, and homomorphically computes C(S,m+k). R additionally blinds the ciphertexts by generating random blinding factors $r_1$ and $r_2$ of an appropriate size, and homomorphically computing C(S, $r_1$(m+k)+$r_2$*q). R sends the ciphertext to S, together with commitments to $r_1$ and $r_2$. R then proves that both ciphertexts were correctly generated, and knowledge of $r_1$, m and $r_2$ that are of a size such that ($r_1$(m+k)+$r_2$*q) does not wrap around in the message space of $pk_S$. The parties can use Camenisch-Shoup proofs of knowledge, using $n_S$ as commitment modulus.

At stage 710, S decrypts C(S, $r_1$(m+k)+$r_2$*q) to receive a value β, and computes $\gamma=\beta^{-1}$ mod q. The modulus removes $r_2$*q, and thus $\gamma=1/r_1(k+m)$ mod q. S then computes $\sigma^*=g^\gamma$, and sends this value to R together with a proof that it was correctly generated.

At stage 712, R computes $g^{1/(k+m)}=\sigma^{*r_1}$, and sends $g^{1/(k+m)}$ to S, together with a proof that it used the same $r_1$ as committed to previously.

The process 700 does not rely on a common modulus between parties S and R, and so instead the parties use a combination of several schemes to ensure security. First, each party has to choose a safe RSA modulus, and makes Pedersen's commitments relative to the other party's modulus, which removes one of the major trust assumptions. Each party still uses Camenisch-Shoup as its homomorphic encryption scheme, but with parameters it generates on its own without a common modulus. Further, the message space for the encryption, Pedersen's commitments, as well as the final PRF evaluation, are each of different sizes, and thus each proof generated by a party should include an interval proof component, showing that the values committed/encrypted are the same across the different message spaces. Specifically, at no time should the message be reduced modulo one of the large spaces.

To ensure that the parties strictly adhere to a restricted domain of values during performance of the protocol, and do not insert extra values on which to evaluate the PRF, each party commits to all the values they will evaluate the PRF on in advance, prove that they are of the correct size, and then prove later in the protocol that the party is only using previously committed values.

Camenisch-Shoup Encryption

The techniques and protocols used herein can employ Camenisch-Shoup Encryption. These encryption techniques can involve the following:

KeyGen: Choose a RSA modulus n=pq. Choose a random nth residue $g=r'^n$ mod $n^2$ for $r \leftarrow Z_{n^2}^*$. Choose $x \leftarrow n^2/4$ and let $y=g_S^x$. The secret key is (p, q, x), and the public key is (n, g, y). For an efficient implementation, p and q should have large prime factors, and can even be safe primes.

Encrypt(m): The ciphertext is a tuple (u,e) where $u=g^r$ mod $n^2$, $e=(1+n)^m \cdot y^r$ mod $n^2 \cdot r$ is chosen at random in $Z_{n/4}$, and m is in [n].

Decrypt(u,e): m can be efficiently recovered given p,q and x by computing $(((e/u^x)-1)$ mod $n^2)/n$.

Message space size=$Z_n$. All messages are implicitly reduced mod n.

ElGamal Encryption

KeyGen: choose a random prime p, and a random generator g for $Z^*_p$. Choose a random $r \in [\phi(p)]$, and set $y=g^r$ mod p. The secret key is r, the public key is (g, p, y)

Encrypt(m): Choose a random r', and compute $u=g^{r'}$ mod p, $e=y^{r'} \cdot m$ mod p. The ciphertext is c=(u,e).

Decrypt(c): compute $m=e/u^r$ mod p.

Knowledge-of Discrete-Log Proofs

This is a three-round protocol to prove knowledge of a discrete logarithm x=log (y) for a publicly known g,y∈some group G and secret x. The proof is as follows:

Both parties know g, y. P knows x such that $y=g^x$. Let k and k' be security parameters.

a. P sends $u=g^r$ for randomly selected $r \leftarrow [-ord(g)*2^{k+k'}, ord(g)*2^{k+k'}]$.

b. V sends a random $c \leftarrow [2^k]$, c. P computes r'=r−cx and sends r' to V d. V verifies that $g^{r'}=u/y$ If the prover knows c in advance, then the prover can select r' first, uniformly at random from $[-ord(g)*2^{k+k'}, ord(g)*2^{k+k'}]$, and then set $u=g^{r'}/y^c$. As long as k' is sufficiently large, the distributions of k' and u has negligible distance from the real distribution. In this way, the protocol can have always honest-verifier zero knowledge: the prover runs the protocol to step b, learns c, and then goes back and cheats to generate u.

The protocol is sound if the discrete log is hard in G. Namely, if P consistently succeeds in convincing V, then a discrete log x' can be extracted such that $y=g^{x'}$. However, the proof is not a proof of knowledge since the x' can be different in different extractions (though all answers would be congruent modulo ord g), whereas a proof of knowledge would always extract the same value. To have a guarantee that the same value will be extracted every time, ord g should additionally be hard to find. The techniques disclosed herein can make use of proofs of knowledge executed in cyclic groups of hidden order, for example as described by Camenisch-Shoup.

Using Fiat-Shamir heuristic in the random oracle model, or by having V commit to c beforehand, this protocol can be transformed into one that is fully zero-knowledge.

Pedersen's Commitment

The Pedersen's commitment allows parties to commit to exponents x in some group G, in a way that is perfectly hiding, and binding based on hardness of discrete-logarithm.

Each party knows common parameters g, h, G, where g and h are different generators of the group G. G can generally be any group, so long as $\log_g$ h is difficult to determine.

a. To commit to a message m, compute a random r←ord (G), and output $c=g^m \cdot h^r$ b. To decommit c to message m, reveal m and r.

Pedersen's commitment is perfectly hiding as long as g and h are indeed generators (or, more weakly, if g∈<h>), since c is perfectly random in G (resp. <h>). This perfectly hiding property holds even if the receiving party knows all kinds of secret information about G. The commitment is additionally binding (modulo ord <g>) as long as log g h is difficult to compute.

If G is a cyclic group of prime order where computing discrete log is hard, it is sufficient to choose g to be any random element (for example by joint coin-tossing), and h to be H(g) where H is a hash function.

Proof of Knowledge of Equality of Committed Value Using Pederson's Commitments

Combining primitives (2)+(3), proofs of knowledge can be obtained of committed values. In particular, one can prove that $y=g^x$, where x is the value committed to in a commitment com. This technique can apply even when y and c lie in different groups. It relies on the security of the Strong RSA assumption.

The order of the group for the commitment com should be hidden to the proving party. In particular, assume that com is computed mod n, where n=pq and p,q are safe primes with p=2p'+1, q=2q'+1. The group for com is, more specifically, the subgroup G of order n'=p'q' within $Z^*_n$. A beneficial property of this group is that, if a random element g of $Z^*_n$ is chosen and raised to power 2, then a high probability exists it is a generator of G.

For soundness to hold and a unique value to be extracted, none of the operations performed should wrap around in the group of hidden order. In particular, x should be sufficiently smaller than n', so that c*x does not wrap around in either group, with some additional slack to guarantee zero knowledge. Thus, if the challenge c is of length k, and zero-knowledge is desired corresponding to security k', and the group containing y has order m, then n' should be $>8 \cdot 2^{k+k'} \cdot m$.

The commitment can be as follows: Let S (sender) and R (receiver) be two parties. Suppose both parties know y, g, m, and S knows x such that $y=g^x$ mod m. Suppose, further, that R has generated n according to the discussion above, and let G' be the subgroup of order n' within $Z^*_n$.

a. First, R proves that n is a safe RSA modulus, following Camenisch-Michels section 5.2 (this step can be ignored, it only compromises the binding guarantee on P if R performed it incorrectly)

b. Then, S and R perform joint coin flipping operations to produce g', h' which are random generators of G'. Alternatively, a weaker constraint is for R to choose g' and h' and prove g'∈<h'>. This preserves the perfect hiding property for S, and only compromises binding if R chooses g' and h' poorly, e.g., such that $\log_{h'}$ g' can be computed.

c. S sends com=$g'^x / h'^r$ mod n for $r \leftarrow [n/4]$ d. S selects $r1 \leftarrow [-2^{\wedge k+k'} \cdot m, 2^{\wedge k+k'} \cdot m]$ and $r2 \leftarrow [-2^{k+k'} \cdot n/4, 2^{k+k'} \cdot n/4]$ and sends $u1=g^{r1}$, $u2=g'^{r1} \cdot h'^{r2}$ to R e. R selects $c \leftarrow 2^k$ at random and sends it to S.

f. S computes $r_1'=r_1-cx$ and $r_2'=r_2-cr$ and sends $r_1'$ and $r_2'$ to R g. R verifies that $g^{r1'}=u1/y^c$ mod m, and $g'^{r1'} \cdot h'^{r2'}=u_2/com^c$ mod n, and further, that $|r_1'| \leq 2^{k+k'} \cdot m$ over the integers. If this is the case, then R concludes that com is a commitment to $x=\log_g y$, and that $|x|<2^{k+k'} \cdot m$.

The protocol above proves that S knows a value x underlying the commitment com, which is also the discrete log of y, and additionally, that $|x|<2^{k+k'} \cdot m$. As such, it is also an interval proof showing that x has bounded size. This latter property follows because $r_1'$ is bounded, and so any x obtained by extracting from 2 accepting proofs, as $x=(r_1'-r_1'')/(c-c')$, will also be bounded.

Camenisch-Shoup has been shown based on the Strong RSA assumption, that this protocol provides a proof of knowledge, and that in particular, the proof has unique extraction when the interval proof component is included.

Interval Proofs

Interval proofs, in general, show that a discrete logarithm is bounded in a particular interval. Interval proofs can be similar to proofs of knowledge of discrete logarithms, except that the final prover message is bounded. This has a slack of $2^k$, where k is length of the challenge c, meaning that if the message is <m, the proof will only convince the verifier that the message is $<2^k \cdot m$.

Joint Coin Tossing

Joint coin tossing is a procedure for two parties to select a random value without either party being able to influence it. For an n-bit random value, each party chooses a random share $r_1$ and $r_2$ respectively of length n bits, and sends a commitment (hash) to the other party of their share. After receiving the other parties commitment, they then each open up the share to the other party, and both set $r=r_1$ XOR $r_2$.

Boneh-Boyen-Style PRF

The Boneh-Boyen signature $f_k(m)=g1/(k+m)$ mod p is a PRF under the strong q-Diffie-Hellman-Inversion assumption, when m∈[q]. That is, $f_k(m)$ is indistinguishable from a random element mod p, as long as m is drawn from the limited domain specified (and this property holds for multiple evaluations of $f_k(m)$).

In particular, the message space [q] should be polynomial sized, since the security reduction actually iterates over every element in the message space.

Detailed Description of oPRF Protocol

Further detail on the oPRF protocol that can be used in implementations consistent with the techniques described herein follows. The protocol uses a security parameter k (oPRF key), but implicitly k is broken down into k'+k" where k' is the challenge length, and k" is the ZK-quality parameter.

Once-And-for-All Setup Phase

In this phase, both parties generate common parameters that can be used across different runs of the entire PSI protocol.

Both parties decide on large primes q, p=tq+1, and a generator g for the cyclic subgroup of order q modulo $Z^*_p$. These can either be pre-fixed parameter, or can be generated as follows:

a) Parties engage in joint coin flipping to jointly select a starting candidate $q_1$.

b) Both parties individually find the first prime $>q_1$, and confirm the results with each other.

c) Both parties find the smallest $t>=2$, such that tq+1 is prime, and set p=tq+1.

d) Both parties perform steps a and b to jointly find a generator g for the subgroup of order q. Note than a random element of $Z^*_p$, raised to the power t, is with high probability a generator of this subgroup (if not, g'=1).

Each party individually selects a safe RSA modulus, $n_1$ and $n_2$ respectively, of size $>2^{3k} \cdot q^2$. Each party keeps the factorization private for the modulus it generated. These moduli are used both for commitments, and for the Camenisch-shoup encryptions. Each party also generates a key for Camenisch-Shoup encryption ($sk_i$, $pk_i$) relative to their modulus $n_i$, consisting of a verified random nth residue g, and $y=g^x$ for secret x.

For modulus $n_1$, Party 1 chooses generators $g_1'$ and $h_1'$ for the large subgroup mod $n_1'$, where $g_1'=h_1'^r$ mod $n_1$ for a randomly chosen $r \leftarrow n_1/4$. Concretely, $h_1'$ is chosen as a random value mod $n_1$, raised to the power 4. Further, Party 1 proves knowledge of $r=\log_{h\_1'} g_1'$ mod $n_1$ to Party 2. Party 2 does the same, selecting generators $g_2'$ and $h_2'$ mod $n_2'$, and proving knowledge of $\log_{h_2'} g_2'$ mod $n_2$.

Per-PSI Protocol Setup Phase

This section discusses the operations performed to setup each PSI protocol run. With reach PSI run, the inputs should be reshuffled and keys reselected to prevent an adversary from correlating information across different PSI runs.

The system shuffle and commit to all values and prove that they are in the correct size. The size proof should be strict to reduce q-DHI. The shuffle does not need to be provable.

Party 1 chooses a random PRF key share $k_1$, and Party 2 chooses $k_2$, each of size $<=q$. Both parties compute the PRF $g^{1/k\_1+k\_2+m)}$ mod p, with key $k_1+k_2$, on various values of m.

Party 1 sends to Party 2 an encryption of $k_1$ under the Camenisch-Shoup key corresponding to $n_1$, and a commitment to $k_1$ under $n_2$. Party 2 also does the same, namely sends an encryption of $k_2$ under the CS-key for $n_2$, and a commitment to $k_2$ under $n_1$.

Party 1 proves knowledge of $k_1$ underlying the encryption, that it is the same as the value it committed to, and that $k_1 <= 2^k \cdot q$. Concretely, it performs the following ZK protocol:

Both parties know:
 $n_1$, g a random value mod $n_1^2$ chosen by Party 1, $g'=g^{n_1}$ mod $n_1^2$, a verified $n_1$th residue, $y=g^x$ mod $n_1^2$, corresponding to the public key of Party 1's Camenisch Shoup scheme.
 $n_2$, $g_2'$, $h_2'$ generators of subgroup of $n_2$, as chosen in step 3,
 (u,e)=encryption of $k_1$ under Camenisch-Shoup key ($n_1$, g', y)
 com=commitment of $k_1$ under $n_2$
Party 1 knows:
 $k_1$, r, r' such that
 $u=g'^r$ mod $n_1^2$
 $e=y^r \cdot (1+n_1)^{k_1}$ mod $n_1^2$
 com$=g_2'^{k_1} h_2'^{r'}$ mod $n_2$
 $|k_1|<q$.
 a. Party 2 commits to a challenge chal in $[2^k]$ under $n_1$
 b. Party 1 chooses $r_1 <- [-2^k \cdot q, 2^k \cdot q]$, $r_2 <- [-2^k \cdot n_1/4, 2^k \cdot n_1/4]$ and $r_3 <- [-2^k \cdot n_2/4, 2^k \cdot n_2/4]$ and sends
  i. $u_1 = g'^{r_2}$ mod $n_1^2$
  ii. $u_2 = (1+n_1)^{r_1} \cdot y^{r_2}$ mod $n_1^2$
  iii. $u_3 = g_2'^{r_1} \cdot h_2'^{r_3}$ mod $n_2$
 c. Party 2 opens the commitment from Step (a), revealing chal.
 d. Party 1 responds with
  i. $r_1' = r_1 - \text{chal} \cdot k_1$
  ii. $r_2' = r_2 - \text{chal} \cdot r$
  iii. $r_3' = r_3 - \text{chal} \cdot r'$
 e. Party 2 verifies that
  i. $g'^{r_2'} = u_1 / u^{\text{chal}}$ mod $n_1^2$
  ii. $(1+n_1)^{r_1'} \cdot y^{r_2'} = u_2 / e^{\text{chal}}$ mod $n_1^2$
  iii. $g_2'^{r_1'} \cdot h_2'^{r_3'} = u_3 / \text{com}^{\text{chal}}$ mod $n_2$
  iv. $|r_1'| < 2^k \cdot q$ Party 2 performs the same protocol in step 7, in reverse, to show knowledge and equality of $k_2$ under the encryption and commitment it produced.

Procedure for Each oPRF Evaluation

Given the setup above, each oPRF evaluation in the protocol can include execution of the following operations. Recall that Party 2 first evaluates the oPRF on each of its committed inputs, and then Party 1 does the same on each of its inputs. In some implementations, each oPRF evaluation requires 33 exponentiations from the sender, and 40 from the receiver (including all proofs, assuming use of the Fiat-Shamir ROM heuristic instead of committing to the challenge).

In the following discussion, the party holding the key is referred to as S, and the receiving party is R. Without loss of generality, S is assumed to be Party 1 and R is assumed to be Party 2, and thus that S knows the factorization of $n_1$, but not of $n_2$, etc.

Notation:
 i) Let $E(k_1)=(u, e)$ be the Camenisch-Shoup encryption of $k_1$ generated by S in Step 7
 ii) Let $n_1$ be S's modulus, and $g_1'$, $h_1'$ the generators for it, and g", y' the other components of S's Camenisch Shoup key send in Step 8 (previously proved to have been used for $E(k_1)$).
 iii) Let $n_2$ be R's modulus, and $g_2'$, $h_2'$ the generators for it
 iv) Let p, g, q be as generated in Step 1
 v) Let $C(k_2) = g_1'^{k_2} * h_1'^{r_1}$ mod $n_1$ and $C(m) = g_1'^{m} * h_1'^{r_2}$ mod $n_1$ be the commitments to $k_2$ and m w.r.t. modulus $n_1$, generated by R in Steps 7 and 5 respectively.
 vi) As before, the security parameter k breaks down as k=k'+k" where k' is the challenge length and k" is the ZK-quality parameter.

1)
 a) R generates 2 random values $a <- [q]$ and $b <- [2^{k-2} * q]$. Let $B = (a*(k_1+k_2+m)) + (b*q)$. R homomorphically generates $E(B) = (u', e')$, an encryption of B under S's Camenisch-Shoup key as follows:
$u' = u^a * g''^{r_3}$ mod $n_1^2$
$e' = e^a * (1+n1)^{a*(k_2+m)} * ((1+n1)^q)^b * y'^{r_3}$ mod $n_1^2$
  for $r_3 <- [n_1/4]$,
 b) R creates C(a), C(b), commitments to a and b with respect to the modulus $n_1$, as follows:
  $C(a) = g_1'^{a} * h_1'^{r_4}$ mod $n_1$, $C(b) = g_1'^{b} * h_1'^{r_5}$ mod $n_1$
  for $r_4, r_5 <- [n_1/4]$
 c) R creates a commitment to $C(a(k_2+m))$ as follows:
  $C(a(k_2+m)) = ((C(k_2) * C(m))^a) * (h_1'^{r_6})$ mod $n_1$
  For $r_6 <- [n_1/4]$,
  $C(a(k_2+m))$ can alternatively be rewritten in terms of previous values:
  $C(a(k_2+m)) = (g_1'^{a(k_2+m)}) * (h_1'^{(a(r_1+r_2)+r_6)})$ mod $n_1$
  Let $r_7 = a(r_1+r_2) + r_6$
2) R sends E(B), C(a), C(b) and $C(a(k_2+m))$ to S, and proves the following:
 i) Knowledge of a, b, $a(k_2+m)$, $r_3, r_4, \ldots, r_7$
 ii) That $|a| <= 2^k * q$ and $|b| < 2^{2k} * q$
 iii) That the same a is used in computing C(a) and E(B), and also for computing $C(a(k_2+m))$ from $C(k_2)$ and C(m).
 iv) That the same b is used in C(b) and E(B).
 v) That the same $(a(k_2+m))$ is used in $C(a(k_2+m))$ and E(B).
The proof is as follows:
 b) S commits to a challenge $c <- 2^{k'}$ (the challenge space, smaller than $2^k$).
 c) R picks $v_1 <- [-2^k \cdot q, 2^k \cdot q]$, $v_2 <- [-2^{2k} \cdot q, 2^{2k} \cdot q]$, $v_3 <- [-2^k \cdot n_1, 2^k \cdot n_1]$, $v_4, \ldots, v_7 <- [-2^k \cdot n_1/4, 2^k \cdot n_1/4]$, $v_8 <- [-2^{2k} \cdot n_1 \cdot q, 2^{2k} \cdot n_1 \cdot q]$
Note that $v_8$ has a larger size. This is because it needs to hide $a(r_1+r_2)+r_6$, which is larger than usual.
 d) R computes
  i) $u_0 = u^{v_1} * g''^{v_4}$ mod $n_1^2$
  ii) $u_1 = e^{v_1} * (1+n_1)^{v_3} * ((1+n_1)^q)^{v_2} * y'^{v_4}$ mod $n_1^2$
  iii) $u_2 = g_1'^{v_1} * h_1'^{v_5}$ mod $n_1$
  iv) $u_3 = g_1'^{v_2} * h_1'^{v_6}$ mod $n_1$ v) $u_4=(C(k_2)*C(m))^{v1}*h_1^{v7} \mod n_1$
vi) $u_5=g_1^{v3}*h_1^{v8} \mod n_1$
and sends $u_0, \ldots, u_5$ to S.
e) S opens its commitment to c
f) R computes $v_1'=v_1-c\cdot a$, $v_2'=v_2-c\cdot b$, $v_3'=v_3-c\cdot a(k_2+m)$, $v_4'=v_4-c\cdot r_3, \ldots, v_8'=v_8-c\cdot n$.
g) S verifies
  i) $u^{v1'}*g^{v4'}=u_0/u^c \mod n_1^2$
  ii) $e^{v1'}*(1+n_1)^{\wedge}(v_3')*((1+n_1)^q)^{\wedge} v_2'*y^{v4'}=u_1/e^c \mod n_1^2$
  iii) $g_1^{v1'}*h_1^{v5'}=u_2/C(a)^c \mod n_1$
  iv) $g_1^{v2'}*h_1^{v6'}=u_3/C(b)^c \mod n_1$
  v) $(C(k_2)*C(m))^{v1'}*h_1^{v7'}=u_4/C(a(k_2+m))^c \mod n_1$
  vi) $g_1^{v3'}*h_1^{v8'}=u_5/C(a(k_2+m))^c \mod n_1$
  vii) That $|v_1'|<=2^{k}*q$ and $|v_2'|<2^{2k}*q$
3) S decrypts $E(B)=(u,e)$ and recovers B, confirms it has absolute size $<2^{2k}\cdot q^2$, and computes $G=B^{-1} \mod q$. Note that, if all steps above are calculated correctly, then $G=1/a(k_1+k_2+m) \mod q$. S computes
  i) $\sigma^*=g^G \mod p$
  ii) $C(B)=g_2^{\prime B} h_2^{\prime r} \mod n_2$
where $r \leftarrow n_2/4$, and sends $\sigma^*$ and $C(B)$ to R. It also proves that $\sigma^*$ was correctly computed. It does so by showing that $\sigma^{*B}=g \mod p$, where B is the same value encrypted in $E(B)$ and committed to in $C(B)$. The proof is as follows, where $(n_1, g', y)$ and $(p,q,x)$ are S's Camenisch-Shoup public and secret keys respectively. S will prove knowledge of B, x and r, and that B is the same in $\sigma^*$, $E(B)$ and $C(B)$, and further that x is the same in $E(B)$ and y:
b) R commits to a challenge $c \leftarrow [2^{k'}]$
c) S picks $v_1 \leftarrow [-2^{3k}\cdot q^2, 2^{3k}\cdot q^2]$, $v_2 \leftarrow [-2^k n_1/4, 2^k n_1/4]$, $v_3 \leftarrow [-2^k\cdot n_2/4, 2^k\cdot n_2/4]$
d) S computes
  i) $u_1=\sigma^{*v1} \mod p$
  ii) $u_2=(1+n_1)^{v1}*u^{v2} \mod n_1^2$
  iii) $u_3=g^{v2} \mod n_1^2$
  iv) $u_4=g_2^{\prime v1}*h_2^{v3} \mod n_2$
and sends $u_1, \ldots u_4$ to R
e) R opens the commitment to c
f) S computes
  i) $v_1'=v_1-c\cdot B$
  ii) $v_2'=v_2-c\cdot x$
  iii) $v_3'=v_3-c\cdot r$
g) R verifies that
  i) $\sigma^{*v1'}=u_1/g^c \mod p$
  ii) $(1+n_1)^{v1'}*u^{v2'}=u_2/e^c \mod n_1^2$
  iii) $g^{v2'}=u_3/y^c \mod n_1^2$
  iv) $g_2^{\prime v1'}*h_2^{v3'}=u_4/C(B)^c \mod n_2$
  v) $|v_1'|<2^{3k}\cdot q^2$
If these hold, then R accepts that $\sigma^*$ is $g^{(B^{\wedge}-1)} \mod p$, where B is the value encrypted in $E(B)$.
4) R computes $\sigma=\sigma^{*a} \mod p$, where a is the same value committed to in $C(a)$ in Step 10b. It sends $\sigma$ to S and proves that $\sigma$ was generated correctly, using similar techniques to those above. (Details omitted), $\sigma=g^{1/(k1+k2+m)} \mod p$ is the value needed.

Malicious Cardinality

The techniques disclosed herein for securely determining cardinality, where both parties learn only the size of the intersection, in the malicious setting are similar to that for secure PSI. Generally, the parties jointly and securely compute an oPRF on each item in each party's list. However, before completing the protocol, the party acting as the sender will verifiably shuffle all the oPRF results. Thus, the receiver will receive correct oPRF evaluations on its list, and can figure out which ones are in the intersection, but because of the shuffling, is unable to discern which oPRF value corresponds to which of its original items.

This protocol can apply a 7-round verifiable shuffle of ElGamal ciphertexts. The modified oPRF protocol is outlined as follows. In some implementations to facilitate shuffling, the oPRF is applied to all messages together, instead of one at a time:

The sender S holds an oPRF key k, and the receiver R has a list of t messages $m_1, \ldots, m_t$.

S generates a key $k_{S1}$ for the Camenisch-Shoup cryptosystem, and a second key $k_{S2}$ for the ElGamal cryptosystem. The ElGamal key is in the same group G (usually a subgroup of order q in $Z^*_p$) in which the PRF will be computed.

S sends R a Camenisch-Shoup homomorphic encryption $C(S_1; k)$ of its PRF key, together with a proof of knowledge of k.

R responds with $C(S_1, B_i)$ where $B_i=b_i*q+a_i(k+m_i)$, commitments $C(a_i)$ and $C(b_i)$, and a proof of knowledge, for every $m_i$ in its list. (So far, this is the same as the PSI oPRF, except all of R's messages are handled together).

S decrypts each ciphertext it receives, and computes $\sigma^*_i=g^{Bi^{\wedge}-1} \mod p$. It then sends ElGamal encryptions $C(S_2, \sigma^*_i)$ to R, and proves that they were correctly computed from the $C(b_i)$s. More explicitly, for each $C(S_2, \sigma^*_i)$, S first sends a commitment $Com(B_i)$ under $n_2$ to R, and then performs the following proof, where $k=k'+k''$ is the security parameter, with challenge length k' and zk-quality k'':

1) Both parties know
  a) $(u_1, e_1)=C(S_1, B_i)$, a ciphertext under S's Camenish Shoup key $(n_1, g, y)$
  b) $(u_2, e_2)=C(S_2, \sigma^*_i)$, a ciphertext under S's ElGamal key $(p, g', y')$
  c) $c_1=Com(B_i)$, a commitment under R's commitment parameters $(n_2, g_2, h_2)$
2) S knows
  a) Camenish Shoup secret key $x_1$
  b) The value $B_i$
  c) ElGamal secret key $x_2$ used for $u_2, e_2$
  d) The randomness r used to generate $c_1$
and wants to prove that
  (i) $e_1=u_1^{x1}\cdot(1+n1)^{Bi} \mod n_1^2$
  (ii) $y=g^{x1} \mod n_1^2$
  (iii) $e_2=u_2^r\cdot(g'^{-1})^{Bi} \mod p$
  (iv) $c_1=g_2^{Bi}\cdot h_2^r \mod n_2$ //this commitment is for soundness and extractability.
  (v) $|B_i|<2^{2k}\cdot q^2$
3) R commits to a random challenge $c \leftarrow 2^k$
4) S chooses random values $r_1 \leftarrow [-2^k n_1/4, 2^k n_1/4]$, $r_2 \leftarrow [-2^{3k}\cdot q^2, 2^{3k}\cdot q^2]$ and $r_3 \leftarrow [-2^k\cdot q, 2^k\cdot q]$, $r_4 \leftarrow [-2^k\cdot n_2/4, 2^k\cdot n_2/4]$ and computes
  a) $v_1=u_1^{r1}\cdot(1+n_1)^{r2} \mod n_1^2$
  b) $v_2=g^{r1} \mod n_1^2$
  c) $v_3=g'^{r3} \mod p$
  d) $v_4=u_2^{r3}\cdot(g'^{-1})^{r2} \mod p$
  e) $v_5=g_2^{r2}\cdot h_2^{r4} \mod n_2$
and sends $v_1, \ldots, v_5$ to R.
5) R reveals the random challenge c
6) S computes
  a) $r_1'=r_1-c\cdot x_1$
  b) $r_2'=r_2-c\cdot B_i$
  c) $r_3'=r_3-c\cdot x_2$
  d) $r_4'=r_4-c\cdot r$
and sends $r_1', r_2', r_3', r_4'$ to R.
7) R verifies that:
  a) $u_1^{r1'}\cdot(1+n_1)^{r2'}=v_1/e_1^c \mod n_1^2$
  b) $g^{r1'}=v_2/y^c \mod n_1^2$
  c) $g'^{r3'}=v_3/y'^c \mod p$ d) $u_2{}^{r_3'} \cdot (g'^{-1})^{r_2'} = v_4/e_2{}^c \bmod p$
e) $g_2{}^{r_2'} \cdot h_2{}^{r_4'} = v_5/c_1{}^c \bmod n_2$
f) $|r_2'| < 2^{3k} \cdot q^2$ concluding the proof.

The same value of $r_1$, $r_1'$, $r_3$ and $r_3'$ can be used across all messages $m_i$, since it refers to the same keys $x_1$ and $x_2$.

R homomorphically computes and sends $C(S2, \sigma_i)$ to S, where $\sigma_i = \sigma^*_i{}^{a_i} \bmod p$, together with proofs that these ciphertexts were correctly determined using the same $a_i$ as committed to earlier. More precisely, for each item i, R performs the following proof:

1) Both parties know:
   a) $u_1, v_1 = C(S_2, \sigma^*_i)$, an ElGamal encryption under S's public key (P, g, y)
   b) $u_2, v_2 = C(S_2, \sigma_i)$, another ElGamal encryption under the same key
   c) $c_1 = Com(a_i)$, the commitment to $a_i$ under S's parameters $(n_1, g_1, y_1)$
2) R knows:
   a) $a_i$ underlying the commitment $c_1$ and such that $\sigma_i = \sigma^*_i{}^{a_i}$
   b) r used the rerandomize $(u_2, v_2)$
   c) r' used in the commitment $Com(a_i)$ And wants to prove that
   d) $u_2 = u_1{}^{a_i} \cdot g^r \bmod p$
   e) $e_2 = e_1{}^{a_i} \cdot y^r \bmod p$
   f) $c_1 = g_1{}^{a_i} \cdot h_1{}^{r'} \bmod n_2$
   g) $|a_i| < 2^k \cdot q$
3) S commits to a challenge c
4) R chooses random values $r_1 \leftarrow [-2^k \cdot q, 2^k \cdot q]$, $r_2 \leftarrow [-2^k \cdot q, 2^k \cdot q]$, $r_3 \leftarrow [-2^k \cdot q, 2^k \cdot q]$ and computes
   a) $v_1 = u_1{}^{r_1} \cdot g^{r_2} \bmod p$
   b) $v_2 = e_1{}^{r_1} \cdot y^{r_2} \bmod p$
   c) $v_3 = g_1{}^{r_1} \cdot h_1{}^{r_2} \bmod m$
   and sends $v_1$, $v_2$ and $v_3$ to S.
5) S decommits to the challenge c
6) R computes
   a) $r_1' = r_1 - c \cdot a_i$
   b) $r_2' = r_2 - c \cdot r$
   c) $r_3' = r_3 - c \cdot r'$
7) S verifies that:
   a) $u_1{}^{r_1'} \cdot g^{r_2'} = v_1/u_2{}^c \bmod p$
   b) $e_1{}^{r_1'} \cdot y^{r_2'} = v_2/e_2{}^c \bmod p$
   c) $g_1{}^{r_1'} \cdot h_1{}^{r_2'} = v_3/c_1{}^c \bmod n_1$ concluding the proof.

S chooses a permutation π, and shuffles and decrypts the list of ciphertexts $C(S_2, \sigma_i)$, to reveal a list $\sigma_{\pi(i)}$ to R. S then sends a Groth proof of correct shuffling and decryption. Before returning the values, S should check that there are no duplicates in the list of decrypted $\sigma_{\pi(i)}$. If there are, S should abort the protocol and conclude that R was cheating.

R concludes that it has received a shuffled PRF evaluation of its list.

The above modified oPRF can adapt to the PSI protocol to provide a secure computation of cardinality. In some implementations, the following additional features can apply, all of which can be handled using the same or corresponding techniques as for PSI.

Each oPRF computation can be based on a split-key computation, where Party 1 has key $k_1$, and Party 2 has key $k_2$, and both are securely computing $PRF_k(m)$ where $k = k_1 + k_2$. To do so, as before, Party 1 acts as sender with key $k_1$, and Party 2 uses $k_2 + m$ as its messages. Together, they securely compute $g^{1/(k_1+k_2+m)}$.

To avoid a CRS, both parties create an RSA modulus, and Party 1 commits with respect to Party 2's modulus and vice versa.

The parties can take care when performing proofs of equality spanning Camenisch-Shoup ciphertexts, ElGamal ciphertexts and commitments, since each of these can have different message spaces. In particular, interval proofs can be used to show that encrypted messages do not wrap around in a message space.

Malicious Intersection Sum (Homomorphic Sum of Items in the Intersection)

In some implementations of the Intersection Sum task, there are two parties A and B with lists of items $M_A = (a_1, \ldots, a_n)$ and $M_B = (b_1, \ldots, b_m)$, and additionally, the items in B's list have values $T_B = (t_1, \ldots, t_m)$ associated with them. The goal is to compute $Sum\{t_i: b_i \in M_A \cap M_B\}$, that is, the sum of the tags (i.e., associated values) of the items that lie in the intersection of the two lists.

The Malicious Cardinality protocol can be modified to include the above functionality. At a high level, the idea is to shuffle the tags along with the associated oPRF values, but to double-encrypt them first, so that neither party knows which $t_i$'s are in the intersection. An exponential ElGamal encryption scheme can be used with threshold decryption.

The malicious blinders may require only a single extra shuffle of the threshold-encrypted ciphertexts of the tag values, in the same order as the shuffle of the IDs. The proof that an additional list of ciphertexts was shuffled in the same way can reuse a lot of the work from the original shuffle proof. In all, this can result in 4n more exponentiations for the sender (3n to verify the encryptions of the tags, and n for the extra shuffle proof), and 6n more exponentiations for the receiver (2n to encrypt the tag values under the joint key, 2n to prove correctness of those encryptions, and 2n to verify the shuffle).

Notably, exponential ElGamal has a restricted ciphertext space. If the sum of tags is too large to be contained in a single exponential ElGamal ciphertext, then the tags can be split into multiple ciphertexts. Each items can thus be associated with multiple tags, which are all shuffled synchronously, and also summed component-wise. This leaks some additional partial-sum information: the sum of each tag-component is revealed. However, this leakage may be insignificant in some settings. Furthermore, each additional tag may require 3n more exponentiations from the sender, and 6n from the receiver.

Exponential ElGamal with Threshold Decryption

Setup: Parties jointly choose a prime $p = tq+1$, and a generator g for the subgroup of order q in $Z^*_p$.

KeyGen: Each party Pi individually chooses $y_i = g^{x_i} \bmod p$, and sets $pk_i = y_i$, $sk_i = x_i$.

Encrypt(m): To encrypt a message m under a set of keys $\{pk_i = y_i\}$, let $Y = prod\{y_i\}$. Set $u = g^r \bmod p$ and $e = Y^r \cdot g^m \bmod p$. The ciphertext is (u, e).

Decrypt($sk_i$, u, e): A single party can partially decrypt the ciphertext using their secret key $x_i$, by computing a new ciphertext (u', e'), where u' = u and $e' = e \cdot u^{-x_i} \bmod p$.

Once all parties have performed partial decryption with their keys, the remaining value is $g^m \bmod p$, which can be recovered by computing discrete log.

Exponential ElGamal can be decrypted only for relatively small messages, but if the message is long, then it can be split between multiple ciphertexts, all of which can be shuffled in a synchronized manner.

The candidate protocol for malicious blinders, using the double-encrypted tag technique, is provided below:

Before oPRF Evaluation:

Both parties choose key shares for the exponential ElGamal scheme (which is additively homomorphic, and has efficient decryption for small messages). Both keys should be in the same group G, concretely, $Z^*_p$ for some jointly chosen prime p.

Both parties share the public keys $y_i$ they generate.

When B commits to their message set $M_B$, B additionally sends an encryption $T_i$ of each tag $t_i$, under the joint exponential ElGamal key Y derived by combining the two keys above, and proves correctness and knowledge of the underlying plaintexts.

During oPRF Evaluation:

During oPRF evaluation, both parties act as in the malicious cardinality protocol when evaluating the oPRF on $M_A$.

When evaluating the oPRF on $M_B$, the parties can also act as in the malicious cardinality protocol, up to the step where the sender S receives encryptions $C(S_2, \sigma_i)$. At this time, as before, the sender shuffles and decrypts these values, sending $\{\sigma_{\pi(i)}\}$ to R. However, S additionally shuffles and re-randomizes the double encrypted tags $T_i$, using the same permutation $\pi$, to send a list $\{T_{\pi(i)}\}$ to R. In doing so, the tags remain associated with the same message, except because of double-encryption, the actual permutation remains hidden.

After oPRF Evaluation:

After the two oPRF evaluations, A and B determine the items in the intersection comparing the PRF evaluations on $M_A$ and $M_B$. For the PRF values in the intersection, each party can individually adds the associated shuffled, double-encrypted tags $T_{\pi(i)}$ to create a double-encrypted sum Enc(sum).

The two parties each verifiably rerandomize Enc(sum). (This step is here to enable the simulator to replace the sum with whatever it wants)

The two parties then each verifiably partially-decrypt the double-encrypted sum, and then individually compute the discrete log to recover the value "sum".

Security Proof

The security proof is similar to that for Malicious PSI and cardinality. Namely, a simulator is provided that can emulate honest transcripts, given a single ideal query each for size of the intersection, and sum of values in the intersection. When the malicious party is A, the simulator only needs to provide the set $M_A$ to the ideal functionality, whereas if the malicious party is B, the simulator provides both $M_B$ and $\{T_i\}$.

At a high level, as in Malicious PSI the simulator extracts all the messages from the values committed in the pre-oPRF phase, and also the tag values underlying the ciphertexts, if applicable, and use this set of messages, and optionally tags, as its single query to the idealized functionality. It then pre-determines the oPRF outcomes on all values so that the simulated oPRF interactions result in a set of the right cardinality. It then cheats in the oPRF evaluation phase so that the oPRF always evaluates to the predetermined value, so that the cardinality computation is correct.

Additionally, it cheats in the verified shuffle of tags Ti, replacing all the encryptions with encryptions of 0. It uses the simulator for the shuffle protocol to achieve this cheating. Both parties compute the encrypted sum on these dummy values, which always comes out to an encryption of 0.

Finally, during the re-randomization step, it replaces the ciphertext encrypting the (fake) sum with a ciphertext of the real sum that it received from the ideal functionality, and simulates the proof of correct re-randomization. By the security of the simulation and the CPA security of the threshold encryption scheme, each of these cheats is undetectable.

The specific order of hybrids: first cheat in the rerandomization step, using a fresh encryption of the real sum instead of the sum computed from the actual oPRF protocols. Next, replace all the encryptions in the output of the shuffled oPRF with encryptions of 0. The simulator for the shuffle protocol guarantees that, as long as the "sum" ciphertext is discarded downstream, which happens because of the first cheating, the simulation becomes indistinguishable from the honest interaction.

Reverse Blinders with Dummy-Based Covert Security

In some implementations, the disclosed techniques involve execution of multiple private intersection-sum protocols between two parties (e.g., $User_1$ and $User_2$) over the course of a day (or other period of time), while guaranteeing that neither party can cheat without being caught. In more detail, $User_1$ has a database $M_1$ storing user identifiers $u_j$.

The external party ($User_2$) has a database $M_2$ storing pairs of user identifiers and associated integer values $(u_i, t_i)$. The $t_i$ can be transaction data associated with user $u_i$.

User 1's data is further broken up into "segments", which are disjoint subsets of $M_1$. The s'th segment of $M_1$ will be referred to as $M_{1,s}$.

The two users would like to allow $User_1$ to learn the per-segment intersection-sum of their datasets. That is, for every s, $User_1$ can learn:

$Sum_s = \Sigma t_i$ such that $(u_i, t_i) \in M_2$ and $u_i \in M_{1,s}$

Additionally, security should be guaranteed against covert adversaries. That is, if one of the users cheats on some appreciable fraction of inputs, the other user should be able to detect the cheating with high probability.

The protocol includes three phases: A once-per-day setup phase, a per-segment phase, and a verification phase at the end of the day.

Per-Day Setup

At the start of the day, $User_2$ uploads an encrypted version of $\{(u_i, Pai_2(t_i))\}$ its encrypted transactions for the day, keyed on user IDs $u_i$. $User_1$ learns $\{f(u_i)\}$ the output of the two-keyed PRF applied to each of $User_2$'s submitted UIDs, and creates a commitment to all such $f(u_i)$, together with re-randomized encryptions $Pai_2(t_i)$, in shuffled order. Any suitable commitment scheme may be employed, such as a Merkle Tree using SHA-256 hashes.

By inserting dummy values into the protocol stages, $User_2$ can verify that $User_1$ performs its operations correctly. By demanding proofs for the encrypted values sent by $User_2$, $User_1$ can ensure that $User_2$ uploads only well-formed data.

Stage 1:

For each $(u_i, t_i)$ in $M_2$, User 2 homomorphically computes $Pai_1(B_i) = Pai_1(a_i(k_1+k_2+u_i)+b_iq) = Pai_1(k_1)^{a_i} * Pai_1(a_1(k_2+u_i)+b_iq)$ for randomly chosen $a_i \leftarrow [q]$, $b_i \leftarrow [2^\lambda * q]$, different for each $u_i$, and also computes $h_i = g^{a_i}$. User 2 also computes $Pai_2(t_i)$, an encryption of the associated transaction value under User 2's own Paillier key.

User 2 also generates dummy tuples $(Pai_1(c_k), g^{d_k}, Pai_2(e_k))$ for random $c_k < 2^{2\lambda} * q^2$, and $d_k$ and $e_k < q$. It generates $(X*M_2)/(1-X)$ such tuples, so that the dummy tuples form an X-fraction of the combined database of $M_2$ and dummies.

User 2 sends all such $(Pai_1(B_i), h_i, Pai_2(t_i))$, real and dummy, to User 1 in shuffled order. By the security of Paillier encryption, the dummy tuples will be indistinguishable from the "real" tuples, $h_i$ in both real and dummy tuples can have the same distribution $g^{random}$.

For each tuple sent, User 2 stores the values $(a_i, b_i, u_i, t_i, r_{enc})$ if the tuple was real, and $(c_k, d_k, e_k, r_{enc})$ if the tuple was dummy, where $r_{enc}$ is the randomness used for Paillier encryption (the index of i and k are dropped on $r_{enc}$ for brevity). It stores these values in the same order as the shuffled pairs sent to User 1.

Stage 2:

For each tuple ($Pai_1(B_i)$, $h_i$, $Pai_2(v_i)$) received in Stage 1, User 1 decrypts to determine $B_i$ and computes $f_i = h_i^{(1/B\_i)}$, and also selects a random value $r_j$, and homomorphically computes $Pai_2(t_i + r_i)$. User 1 also rerandomizes the ciphertext $Pai_2(t_i + r_i)$, and stores the randomness $r'_{enc}$ used for rerandomization.

User 1 shuffles the tuples $\{(f_i, Enc_2(t_i + r_i), n, r'_{enc})\}$, commits to each entry separately, and sends the commitments to User 2, while maintaining a copy of the underlying values, including the $r_i$ and $r'_{enc}$ values used. It also remembers the order of the shuffle.

Stage 3:

For every dummy generated in Stage 1, User 2 sends the tuple ($c_k$, $d_k$, $e_k$, $r_{enc}$) to User 1, along with the shuffled location of the tuple in Stage 1. This reveals to User 1 that the tuple was a dummy.

Stage 4:

For each tuple ($c_k$, $d_k$, $e_k$, $r_{enc}$) received, User 1 regenerates $f_k = g^{\wedge}(d_k/c_k)$ and sends openings to the commitments of ($f_k$, $Pai_2(e_k + r_k)$, $r_k$, $r'_{enc}$) to User 2. User 2 can use these to verify that the dummy pair it sent at index k was correctly manipulated and committed to by User 1 (see Stage 5 below)

User 1 also selects an X-fraction subset J of the non-dummy tuples received from User 2 in Stage 1. It asks User 2 to provide a proof that these were correctly generated.

Stage 5:

For each dummy tuple, User 2 verifies that the openings supplied by User 1 are correct, namely that $f_k = g^{\wedge}(d_k/c_k)$ and that $Pai_2(t_k + r_k)$ is an encryption of $e_k + r_k$ using randomness $r_{enc}$ and rerandomized using $r'_{enc}$. User 2 also checks that the commitments sent by User 1 correctly open to ($f_i$, $Pai_2(t_i + r_i)$, n, $r'_{enc}$).

For each index i in the set J, User 2 creates a proof that tuple i was generated correctly in Stage 1. It does so by proving knowledge of $a_i$ and $a_i k_2 + a_i u_i + b_i q$ such that $Pai_1(a_i(k_1 + k_2 + u_i) + b_i q) = Pai_1(k_1)^{\wedge} a_i * Pai_1(a_i k_2 + a_i u_i + b_i q)$ $h_i = g^{a\_i}$, with the same exponent $a_i$ as used to exponentiate $Pai_1(k_i)$.

$a_i < 2^{\lambda} * q$ $a_i k_2 + a_i u_i + b_i q < 2^{2\lambda} * q^2$

These proofs can be standard sigma protocols for knowledge of exponent. The challenges need not be restricted to be of size $\{0,1\}$, since the Paillier key was generated by the verifier, not the prover. During the setup-stage proofs, because the prover generated the Paillier key, it could cheat if the challenges were not in $\{0,1\}$.

User 2 sends all such proofs to User 1. These proofs do not constrain User 2 to use the same k2 everywhere, or even to use the same k2 as it sent in Pai2(k2) during setup. However, using a different k2, say k2+x, for a particular index i, is equivalent to keeping k2 the same and changing ui to ui+x, which User 2 can do. Thus, no extra power is given to User 2 by not checking that k2 is the same everywhere.

Stage 6:

User 1 verifies each proof received.

Stages 3, 4, 5 and 6 are "audit" style stages that provide a probabilistic guarantee of catching a cheating user. They can be performed at any later point (e.g., merged into later per-segment messages), as long as they are performed in the same order relative to each other (e.g., Stage 3 before Stage 4 before Stage 5, and so on).

Per-Segment Protocol

The per-segment protocol is similar in flavor to the start of the day protocol, except with the roles of the users reversed.

Stage 1:

For each $u_j$ in $M_{1,s}$. User 1 homomorphically computes $Pai_2(B_j) = Pai_2(a_j(k_1 + k_2 + u_j) + b_j q) = Pai_2(k_2)^{a_j} * Pai_2(a_j(k_1 + u_j) + b_j q)$ for randomly chosen $a_j < -[q]$, $b_j < -[2^{\lambda} * q]$, different for each $u_j$, and also computes $h_j = g^{a\_j}$.

User 1 also generates an X fraction of dummy tuples ($Pai_2(c_k)$, $g^{d\_k'}$) for random $c_k < 2^{2\lambda} * q^2$, and $d_k < q$.

User 1 sends all such ($Pai_2(B_j)$, $h_j$), real and dummy, to User 2 in shuffled order.

For each tuple sent, User 2 also remembers the values ($a_j$, $b_j$, $u_j$, $r_{enc}$) if the pair was real, and ($c_k$, $d_k$, $r_{enc}$) if the pair was dummy, where $r_{enc}$ is the randomness used for encryption. It stores these values in the same order as the shuffled pairs sent to User 2.

Stage 2:

For each tuple ($Pai_2(B_j)$, $h_j$) received in Stage 1, User 2 decrypts to get $B_j$ and computes $f_j = h_j^{(1/B\_j)}$. It sends all such fj to User 1 in shuffled order.

Stage 3:

For each dummy generated in Stage 1, User 1 sends the tuple ($c_k$, $d_k$, $r_{enc}$) to User 2, revealing that the tuple at that index was a dummy. User 1 further checks that $g^{dk/ck}$ appears in the list of $f_j$ received by User 1 in Stage 2.

For each remaining $f_j$ received by User 1 in Stage 2 (i.e., not corresponding to dummy $g^{dk/ck}$), User 1 looks it up in the start-of-the-day commitments. For all fj that are found, User 1 homomorphically adds the corresponding blinded Paillier ciphertexts, to get $Pai_2(Sum^*) = Pai_2(\Sigma_{Intersection}(t_i + r_i))$ User 1 additionally generates T Paillier ciphertexts $Pai_2(r^*_i)$, corresponding to dummy sums.

User 1 sends $Pai_2(Sum^*)$ and $Pai_2(r^*_i)$ to User 2, shuffled amongst each other. User 1 separately sends T commitments $\{Com(r_i)\}$ to the values underlying the Paillier ciphertexts.

User 1 also sends User 2 a list of indices corresponding to the intersection, and commitment openings of the corresponding $f_i$ values (but not the $Pai(t_i + r_i)$, $r_i$ or $r'_{enc}$ values).

Stage 4:

For each dummy tuple opening ($c_k$, $d_k$, $r_{enc}$) received in Stage 3, User 2 verifies that it received the corresponding dummy tuple ($Pai_2(c_k, r_{enc})$, $g^{d\_k}$) in Stage 1.

User 2 also verifies the commitment openings corresponding to the intersection, and checks that the intersection size is large enough.

If so, User 2 decrypts each Paillier ciphertext received from User 1, and sends the decryptions back to User 1.

User 2 also selects an X-fraction subset J of the non-dummy tuples received from User 1 in Stage 1. It requests User 1 to provide a proof that they were correctly generated.

Stage 5:

User 1 verifies that each dummy value $r^*_i$ appears in the response sent by User 1 in the prior stage. If so, it sends openings to each of the $Com(n^*)$ that User 1 sent in Stage 3.

User 1 also sends proofs that each of the tuples in the index set J was produced correctly. (The proof User 1 sends is analogous to the one that User 2 provides in Stage 4 of the start-of-the-day protocol).

User 1 also sends commitment openings to the $Pai_2(t_i+r_i)$ values for the intersection.

Finally, User 1 computes $Sum_s=Sum^*-\Sigma_{intersection}r_i$, which is the sum for the segment, User 1's output for the protocol.

Stage 6:

User 2 verifies the proofs and commitment openings sent by User 1 in the previous stage. It also decrypts each $Pai_2(t_i+r_i)$, and verifies that $Sum^*=\Sigma_{Intersection}(t_i+r_i)$, as expected.

End-of-Day Protocol

The end-of-day protocol is executed after all segments have completed execution.

Stage 1:

At the end of the day, User 1 opens the remaining, unused commitments to $f_i$ from the start of the day (not the commitments to $Pai(t_i+r_i)$, $r_i$ or $r'_{enc}$), and sends the openings to User 2.

Stage 2:

User 2 verifies that the openings are correct openings of the commitments received at the start of the day.

It also verifies that the $f_i$ values in the openings are consistent with the intersections seen in each segment. User 2 checks that none of the newly revealed $f_i$ were improperly omitted from some segment intersection by User 1.

Batching of Paillier Ciphertexts

Instead of sending separate Paillier ciphertexts for each database entry, users can batch the Paillier ciphertext for multiple entries together by packing those values into a single plaintext. This would greatly reduce the amount of communication, since each Paillier ciphertext could be packed to its maximum size, instead of wasting a large amount of plaintext space. The ZK-proofs and dummy strategies can also be transferred to the batched setting. However, the shufflings performed in the protocol would have to preserve the proximity of batched database entries, this leaks slightly more information than the non-batching version of the protocol. In addition, the dummies sent during the protocol may only be batched with other dummies, otherwise the ZK-proofs and dummy-insertion strategy described above would no longer be possible to execute.

Figure 10:
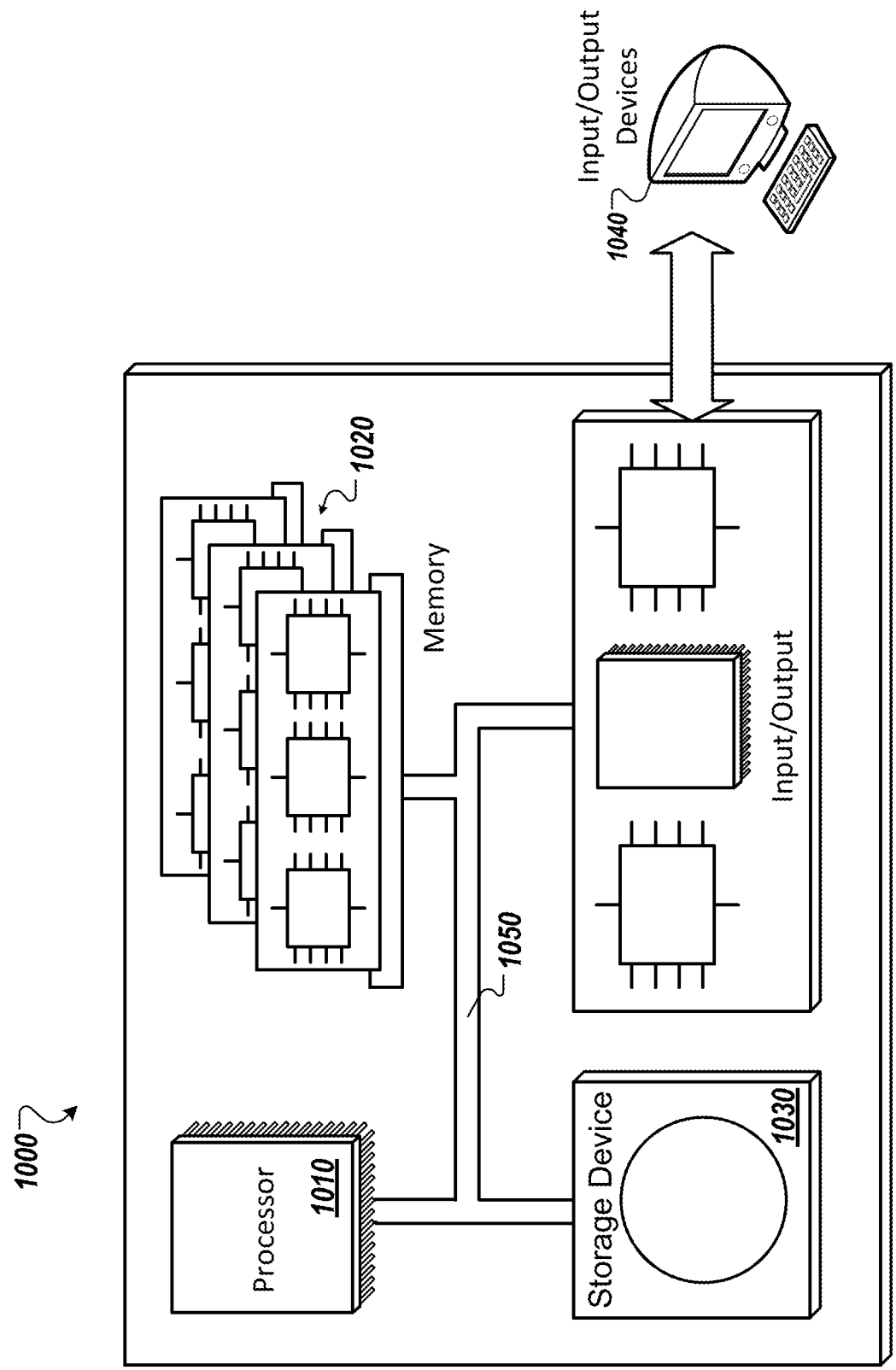
FIG. 10 depicts a schematic diagram of an example computer system that can be used to perform the operations associated with the computer-implemented methods and other techniques described herein

FIG. 10 is a schematic diagram of a computer system 1000. The system 1000 can be used to carry out the operations described with respect to any of the computer-implemented methods described previously, according to one implementation. The system 1000 is intended to include various forms of digital computers, such as laptops, desktops, workstations, personal digital assistants, servers, blade servers, mainframes, and other appropriate computers. The system 1000 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. The processor may be designed using any of a number of architectures. For example, the processor 1010 may be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 400. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 400. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for preserving privacy in comparing private datasets of a first computing system and a second computing system, the method comprising:
   identifying, by the second computing system, a first set of identifiers corresponding to records in a private database of the second computing system;
   for each identifier in the first set of identifiers:
   (i) generating, by the second computing system, an encrypted version of the identifier using a homomorphic encryption process,
   (ii) providing, from the second computing system and to the first computing system, the encrypted version of the identifier,
   (iii) receiving, by the second computing system and from the first computing system, a blinded-encrypted version of the identifier that was generated using a secret key of the first computing system, wherein the first computing system generates the blinded-encrypted version of the identifier by processing the encrypted version of the identifier and the secret key of the first computing system, and
   (iv) decrypting, by the second computing system, the blinded-encrypted version of the identifier to generate a blinded version of the identifier;
   receiving, by the second computing system, blinded versions of a second set of identifiers corresponding to records in a private database of the first computing system;
   determining, by the second computing system, an intersection, or a characteristic of the intersection, of the records in the private database of the first computing system and the records in the private database of the second computing system based on matches between the blinded versions of the first set of identifiers and the blinded versions of the second set of identifiers; and
   providing, by the second computing system, an indication of the intersection or the characteristic of the intersection.

2. The method of claim 1, wherein for each identifier in the first set of identifiers, the first computing system generates the blinded-encrypted version of the identifier by processing the encrypted version of the identifier and the secret key of the first computing system according to a pseudo-random function.

3. The method of claim 2, wherein the pseudo-random function is an oblivious pseudo-random function.

4. The method of claim 2 wherein the second computing system modifies the encrypted version of the identifier before providing it to the first computing system by combining the encrypted version of the identifier with a secret key of the second computing system, and wherein the first computing system generates the blinded-encrypted version of the identifier further based on the secret key of the second computing system by processing the modified encrypted version of the identifier according to the pseudo-random function.

5. The method of claim 4, wherein for each identifier in the first set of identifiers, the second computing system modifies the encrypted version of the identifier by homomorphically adding the secret key of the second computing system to the encrypted version of the identifier.

6. The method of claim 1, further comprising:
for each identifier in the first set of identifiers, mapping by the second computing system the blinded version of the identifier to the identifier; and
for each identified match between a blinded version of an identifier from the first set of identifiers and a blinded version of an identifier from the second set of identifiers:
identifying, by the second computing system, the record in the private database of the second computing system that corresponds to the identifier that is mapped to the blinded version of the identifier from the first set of identifiers; and
classifying, by the second computing system, the identified record as being within the intersection of the records in the private database of the first computing system and the records in the private database of the second computing system.

7. The method of claim 6, wherein the second computing system receives, from the first computing system, the blinded-encrypted versions of the first set of identifiers in a first order that corresponds to a second order that the second computing system provided the encrypted versions of the first set of identifiers to the first computing system.

8. The method of claim 7, wherein the first order is identical to the second order such that the second computing system receives, from the first computing system, the blinded-encrypted versions of the first set of identifiers in a same order that the second computing system provided the encrypted versions of the first set of identifiers to the first computing system.

9. The method of claim 1, comprising determining, by the second computing system, the characteristic of the intersection of the records in the private database of the first computing system and the records in the private database of the second computing system, without determining which records are within the intersection.

10. The method of claim 9, wherein the characteristic of the intersection represents a count of a number of common identifiers included in both the first set of identifiers corresponding to records in the private database of the second computing system and the second set of identifiers corresponding to records in the private database of the first computing system.

11. The method of claim 9, wherein the characteristic of the intersection represents a sum of values stored in records of the private database of the second computing system that are within the intersection of records between the private database of the first computing system and the private database of the second computing system.

12. The method of claim 1, wherein a first subset of identifiers from the first set of identifiers are also included among the second set of identifiers, and a second subset of identifiers from the first set of identifiers are not included among the second set of identifiers.

13. The method of claim 1, further comprising:
determining, by the second computing system, whether the first computing system blinded the encrypted versions of the first set of identifiers without deviating from a prescribed protocol; and
in response to verifying that the first computing system deviated from the prescribed protocol in blinding the encrypted versions of the first set of identifiers, taking action to stop performance of the prescribed protocol.

14. The method of claim 1, further comprising:
inserting, by the second computing system, dummy identifiers into the first set of identifiers, the dummy identifiers not corresponding to the records in the private database of the second computing system; and
after receiving the blinded-encrypted versions of the first set of identifiers from the first computing system, verifying that the first computing system properly blinded encrypted versions of the dummy identifiers.

15. The method of claim 1, wherein:
the first set of identifiers that correspond to the records in the private database of the second computing system identify users who were party to transactions with an entity associated with the second computing system; and
the second set of identifiers that correspond to the records in the private database of the first computing system identify users who were served digital media items of the entity associated with the second computing system.

16. A computing system, comprising:
a private database, on one or more computers, storing a plurality of data records, each data record including an identifier representing an identity of the data record or an identity of a user represented in the data record;
one or more hardware processors; and
one or more computer-readable media having instructions stored thereon that, when executed by the one or more hardware processors, cause performance of operations comprising:
identifying, by the computing system, a first set of identifiers corresponding to records in a private database of the computing system;
for each identifier in the first set of identifiers:
(i) generating, by the computing system, an encrypted version of the identifier using a homomorphic encryption process,
(ii) providing, from the computing system and to a remote computing system, the encrypted version of the identifier,
(iii) receiving, by the computing system and from the remote computing system, a blinded-encrypted version of the identifier that was generated using a secret key of the remote computing system, wherein the remote computing system generates the blinded-encrypted version of the identifier by processing the encrypted version of the identifier and the secret key of the remote computing system, and
(iv) decrypting, by the computing system, the blinded-encrypted version of the identifier to generate a blinded version of the identifier;
receiving, by the computing system, blinded versions of a second set of identifiers corresponding to records in a private database of the remote computing system;
determining, by the computing system, an intersection, or a characteristic of the intersection, of the records in the private database of the remote computing system and the records in the private database of the computing system based on matches between the blinded versions of the first set of identifiers and the blinded versions of the second set of identifiers; and
providing, by the computing system, an indication of the intersection or the characteristic of the intersection.

17. The computing system of claim 16, wherein for each identifier in the first set of identifiers, the remote computing system generates the blinded-encrypted version of the identifier by processing the encrypted version of the identifier and the secret key of the remote computing system according to a pseudo-random function.

18. The computing system of claim 16, wherein the operations further comprise:
for each identifier in the first set of identifiers, mapping by the computing system the blinded version of the identifier to the identifier; and
for each identified match between a blinded version of an identifier from the first set of identifiers and a blinded version of an identifier from the second set of identifiers:
identifying, by the computing system, the record in the private database of the computing system that corresponds to the identifier that is mapped to the blinded version of the identifier from the first set of identifiers; and
classifying, by the computing system, the identified record as being within the intersection of the records in the private database of the remote computing system and the records in the private database of the computing system.

19. The computing system of claim 16, wherein:
the first set of identifiers that correspond to the records in the private database of the computing system identify users who were party to transactions with an entity associated with the computing system; and
the second set of identifiers that correspond to the records in the private database of the remote computing system identify users who were served digital media items of the entity associated with the computing system.

20. One or more non-transitory computer-readable media having instruction stored thereon that, when executed by one or more processors, cause the one or more processors to perform operations comprising:
identifying, by a second computing system, a first set of identifiers corresponding to records in a private database of the second computing system;
for each identifier in the first set of identifiers:
  (i) generating, by the second computing system, an encrypted version of the identifier using a homomorphic encryption process,
  (ii) providing, from the second computing system and to a first computing system, the encrypted version of the identifier,
  (iii) receiving, by the second computing system and from the first computing system, a blinded-encrypted version of the identifier that was generated using a secret key of the first computing system, wherein the first computing system generates the blinded-encrypted version of the identifier by processing the encrypted version of the identifier and the secret key of the first computing system, and
  (iv) decrypting, by the second computing system, the blinded-encrypted version of the identifier to generate a blinded version of the identifier;
receiving, by the second computing system, blinded versions of a second set of identifiers corresponding to records in a private database of the first computing system;
determining, by the second computing system, an intersection, or a characteristic of the intersection, of the records in the private database of the first computing system and the records in the private database of the second computing system based on matches between the blinded versions of the first set of identifiers and the blinded versions of the second set of identifiers; and
providing, by the second computing system, an indication of the intersection or the characteristic of the intersection.

* * * * *